United States Patent
Thaxton et al.

(10) Patent No.: US 12,341,384 B2
(45) Date of Patent: Jun. 24, 2025

(54) MULTI-METALLIC MECHANICAL RETENTION HOOP

(71) Applicant: DRS Naval Power Systems, Inc., Milwaukee, WI (US)

(72) Inventors: Edgar S. Thaxton, Groton, MA (US); Calvin H. Corey, III, Scituate, MA (US)

(73) Assignee: DRS Naval Power Systems, Inc., Menomonee Falls, WI (US)

( * ) Notice: Subject to any disclaimer, the term of this patent is extended or adjusted under 35 U.S.C. 154(b) by 148 days.

(21) Appl. No.: 17/945,728

(22) Filed: Sep. 15, 2022

(65) Prior Publication Data

US 2023/0078127 A1 Mar. 16, 2023

Related U.S. Application Data

(60) Provisional application No. 63/244,558, filed on Sep. 15, 2021.

(51) Int. Cl.
*H02K 1/28* (2006.01)
*H02K 1/27* (2022.01)
(Continued)

(52) U.S. Cl.
CPC .............. *H02K 1/30* (2013.01); *H02K 1/278* (2013.01); *H02K 15/03* (2013.01); *B33Y 80/00* (2014.12)

(58) Field of Classification Search
CPC .......... H02K 1/30; H02K 1/278; H02K 15/03; H02K 1/28; H02K 1/02; H02K 1/04;
(Continued)

(56) References Cited

U.S. PATENT DOCUMENTS

| | | | |
|---|---|---|---|
| 3,737,696 | A | 6/1973 | Richter et al. |
| 8,310,123 | B2 | 11/2012 | Saban et al. |

(Continued)

FOREIGN PATENT DOCUMENTS

EP    1811631 A2    7/2007

OTHER PUBLICATIONS

"Stave, N. (2)." Oxford English Dictionary, Oxford UP, Sep. 2024, https://doi.org/10.1093/OED/1088533750. (Year: 2024).*

(Continued)

*Primary Examiner* — Thomas Truong
(74) *Attorney, Agent, or Firm* — Kilpatrick Townsend & Stockton LLP

(57) ABSTRACT

A retention structure can be created using two or more different materials (e.g., one magnetic material, and one non-magnetic material) as a composite structure. The retention structure can include a cylindrical hoop comprising one or more one or magnetic regions tangentially alternating with one or more non-magnetic regions configured to surround and retain a plurality of magnets to a rotor, wherein the one or more magnetic regions are aligned with each one of the plurality of magnets and the one or more non-magnetic regions are aligned with one or more spaces between the plurality of magnets on the rotor. The magnetic material allows flux from the permanent magnets to flow through to the stators and the non-magnetic sections reduce leakage of magnetic flux to adjoining permanent magnets through use of non-magnetic materials. The retention structure can be fabricated using a hot isostatic press process.

20 Claims, 20 Drawing Sheets

(51) Int. Cl.
*H02K 1/278* (2022.01)
*H02K 1/30* (2006.01)
*H02K 15/03* (2006.01)
*B33Y 80/00* (2015.01)

(58) Field of Classification Search
CPC ........ H02K 15/14; B33Y 80/00; B33Y 10/00; B22F 3/1258; B22F 3/1291; B22F 3/15; B22F 5/106; B22F 7/08; B22F 10/20
See application file for complete search history.

(56) References Cited

U.S. PATENT DOCUMENTS

| | | |
|---|---|---|
| 2003/0000336 A1 | 1/2003 | Tsai |
| 2003/0063993 A1* | 4/2003 | Reiter, Jr. .............. H02K 15/03 419/36 |
| 2003/0110615 A1* | 6/2003 | Ku .......................... H02K 1/34 29/598 |
| 2003/0193258 A1* | 10/2003 | Reiter, Jr. .............. H02K 1/265 310/216.004 |
| 2008/0303368 A1 | 12/2008 | Rahman et al. |
| 2009/0102304 A1 | 4/2009 | Yamamura et al. |
| 2013/0043756 A1* | 2/2013 | Bradley .................. H02K 5/128 310/156.28 |
| 2015/0214798 A1* | 7/2015 | Tajima ................... H02K 29/03 310/156.19 |
| 2020/0014290 A1 | 1/2020 | Bikmukhametov |

OTHER PUBLICATIONS

Application No. PCT/US2022/043685, International Search Report and Written Opinion, Mailed On Feb. 7, 2023, 12 pages.
PCT/US2022/043685, "Invitation to Pay Additional Fees and, Where Applicable, Protest Fee", Nov. 23, 2022, 2 pages.

* cited by examiner

MULTI-METALLIC MECHANICAL RETENTION HOOP

CROSS-REFERENCES TO RELATED APPLICATIONS

This application claims priority to and the benefit of U.S. Provisional Patent Application No. 63/244,558, filed Sep. 15, 2021, entitled "MULTI-METALLIC Mechanical Retention Hoop and Techniques for Manufacturing Thereof" hereby incorporated by reference in its entirety and for all purposes.

BACKGROUND OF THE INVENTION

Electric motors can generate torque using a rotor assembly with a plurality of permanent magnets affixed to the rotor rim, forming a magnetic moment arm. Alternating current can flow through a stator assembly generating an inductive magnetic field that interacts with the permanent magnets mounted on a rotor assembly. There is a magnetic air gap between the permanent magnets on the rotor assembly and the stator assembly. This interaction generates a force on the shaft of the electric motor generating torque. Various techniques (e.g., glue, fasteners) have been used to retain the permanent magnets to the rotor rim. Several of the techniques (e.g., glue) can be inappropriate for the use in high-speed machines.

Current designs may include a mechanical retention structure to retain the magnets that is comprised of magnetic or non-magnetic materials. The use of completely magnetic materials for the retention structure can result in flux leakage between areas over the permanent magnets to adjacent permanent magnets reducing the flux linked from the rotor to stator and power of the motor. The use of completely non-magnetic materials for the retention structure will increase the magnetic air gap or the gap between the magnets and the stator assembly, thereby reducing the strength of the magnetic flux that reaches the stators and ultimately the maximum power capability of the motor. Thus, there is a need in the art for improved methods and systems related to electric motors.

SUMMARY OF THE INVENTION

Embodiments of the present invention relate generally to methods and systems for electric motors and generators. More particularly, a retention structure can be created using two or more different materials (e.g., one magnetic material, and one non-magnetic material) to form a composite structure in which dissimilar materials are bonded together. The retention structure can include a hoop comprising one or more one or magnetic regions tangentially alternating with one or more non-magnetic regions configured to surround and retain a plurality of magnets to a rotor, wherein the one or more magnetic regions are aligned with each one of the plurality of magnets and the one or more non-magnetic regions are aligned with one or more spaces between the plurality of magnets on the rotor. The magnetic material allows flux from the permanent magnets to flow through to the stators and the non-magnetic sections reduce leakage of magnetic flux to adjoining permanent magnets using non-magnetic materials. The retention structure can be formed using composite materials (e.g., carbon fiber or fiberglass materials), a steel cylinder (e.g., a non-magnetic can), or other metallic materials.

In various embodiments, the cylindrical hoop can provide a continuous magnetic air gap between the plurality of magnets and one or more magnetic regions of a stator while reducing magnetic flux leakage across the one or more non-magnetic regions. In various embodiments, the one or more magnetic regions and the one or more non-magnetic regions form staves of the cylindrical hoop.

In addition to retaining the plurality of magnets to the rotor rim against the radial and tangential forces generated by the rotating rotor, the cylindrical hoop can be sized to provide a pre-loaded force to the plurality of magnets of the rotor. The pre-loaded force can maintain enough friction on the rotor assembly, so the magnets do not turn when the machine is transmitting torque. The retention structure prevents the magnets from coming off at high speed and can also reduce the pressure that the magnets exert on the inner structure of the pole retention structure.

In some aspects a retention structure can include a cylindrical hoop including one or magnetic regions tangentially alternating with one or more non-magnetic regions configured to surround and retain a plurality of magnets to a rotor. The cylindrical hoop can be formed via a hot isostatic pressing process. The one or more magnetic regions can be each aligned with one of the plurality of magnets and the one or more non-magnetic regions can be each aligned with one or more spaces between the plurality of magnets on the rotor.

In some aspects the cylindrical hoop provides for a continuous magnetic air gap between the plurality of magnets and one or more magnetic regions of a stator while reducing magnetic flux leakage across the one or more non-magnetic regions.

In some aspects the one or more magnetic regions and the one or more non-magnetic regions form staves of the cylindrical hoop.

In some aspects the cylindrical hoop is sized to provide a pre-load force to the plurality of magnets of the rotor.

In some aspects the one or more magnetic regions are a combination of a plurality of materials forming different layers.

In some aspects the one or more non-magnetic regions are a combination of a plurality of materials forming different layers.

In some aspects the magnetic regions are formed with a crowned exterior surface of at least one of the one or more magnetic regions to shape flux lines of the plurality of magnets.

In some aspects an interior surface of the cylindrical hoop is not circular and is sized to accommodate rectangular magnets or other non-arc segmented magnet configurations.

In some aspects an exterior surface of the cylindrical hoop comprises magnetic and non-magnetic materials that is continuous.

In some aspects, an electric machine includes a housing, a rotor, and a stator. The electric machine can be an electric motor or an electric generator. The rotor can include a plurality of permanent magnets retained by a cylindrical retaining sleeve including one or magnetic regions tangentially alternating with one or more non-magnetic regions configured to surround and retain a plurality of magnetics to the rotor. The one or more magnetic regions can be aligned with each one of the plurality of magnets and the one or more non-magnetic regions are aligned with one or more spaces between the plurality of magnets on the rotor. The stator can surround the rotor having a defined air gap between the cylindrical retaining sleeve and a plurality of magnetic regions on the stator.

In some aspects the cylindrical retaining sleeve can provide for a continuous radial magnetic air gap between the plurality of permanent magnets and one or more magnetic regions of a stator while reducing magnetic flux leakage across the one or more non-magnetic regions.

In some aspects the one or more magnetic regions and the one or more non-magnetic regions form staves of the cylindrical retaining sleeve.

In some aspects the cylindrical retaining sleeve is sized to provide a pre-load force to the plurality of permanent magnets of the rotor.

In some aspects the one or more magnetic regions are a combination of a plurality of materials forming different layers.

In some aspects the one or more non-magnetic regions are a combination of a plurality of materials forming different layers.

In some aspects the magnetic regions are formed with a crowned exterior surface of at least one of the one or more magnetic regions to shape of flux lines of the plurality of permanent magnets.

In some aspects an interior surface of the cylindrical retaining sleeve is not circular and is sized to accommodate rectangular magnets.

In some aspects an exterior surface of the cylindrical retaining sleeve comprises magnetic and non-magnetic materials that is continuous.

In some aspects, a method of forming a retention structure including magnetic regions and non-magnetic regions can include providing a mold for reception of at least one powder for compaction. The at least one powder can include either a magnetic material or a non-magnetic material. The method can include determining a position of shape-control elements along at least one wall of the mold. The shape-control elements can be configured to control a deformation of the mold during hot isostatic pressing; positioning the shape-control elements along one or more walls of the mold. The method can include deforming the mold while compacting the at least one powder during hot isostatic pressing to form a cylindrical hoop structure.

In some aspects the magnetic regions are formed using a solid material and the non-magnetic regions are formed using the one or more powder comprising the non-magnetic material.

In some aspects the non-magnetic regions are formed using a solid material and the magnetic regions are formed using the at least one powder comprising magnetic material.

In some aspects the non-magnetic regions and the magnetic regions are formed using the at least one powder including the magnetic material and the non-magnetic materials.

In some aspects the non-magnetic regions and the magnetic regions are formed using solid materials.

In some aspects the method can include inserting a boundary material between the magnetic regions and the non-magnetic regions, wherein the boundary material blocks carbon transfer during the hot isostatic pressing.

In some aspects the method can include forming a mechanical geometry joint at a boundary between the magnetic regions and the non-magnetic regions.

In some aspects, a method of forming a retention structure including magnetic regions and non-magnetic regions can include positioning one or more magnetic materials over one or more magnets of a rotor assembly. The method can include positioning one or more non-magnetic materials over one or more spacers. The spacers can be positioned between the one or more magnets. The method can include welding an edge of the one or more magnetic materials to an edge of the one or more non-magnetic materials to form a cylindrical retention structure sized to fit around the one or more magnets of the rotor assembly.

In some aspects, a method of forming a retention structure including magnetic regions and non-magnetic regions can include positioning one or more magnetic materials over one or more magnets of a rotor assembly. The method can include positioning one or more non-magnetic materials over one or more spacers. The spacers can be positioned between the one or more magnets. The method can include forming a cylindrical retention structure sized to fit around the one or more magnetic materials and the one or more non-magnetic materials. The forming of the cylindrical retention structure can be implemented via a three-dimensional printing process.

In some aspects the magnetic regions can be formed using a solid material and the non-magnetic regions can be formed using one or more powders comprising the one or more non-magnetic materials.

In some aspects the non-magnetic regions can be formed using a solid material and the magnetic regions can be formed using at least one powder comprising magnetic material.

In some aspects the non-magnetic regions and the magnetic regions can be formed using at least one powder including the one or more magnetic materials and the one or more non-magnetic materials.

In some aspects the non-magnetic regions and the magnetic regions can be formed using solid materials.

In some aspects the method can include inserting a boundary material between the magnetic regions and the non-magnetic regions, wherein the boundary material blocks carbon transfer during the three-dimensional printing process.

In some aspects the method can include forming a mechanical geometry joint at a boundary between the magnetic regions and the non-magnetic regions.

In some aspects, a method of forming a retention structure including magnetic regions and non-magnetic regions can include includes positioning one or more magnetic materials over one or more magnets of a rotor assembly. The method can include positioning one or more non-magnetic materials over one or more spacers. The spacers can be positioned between the one or more magnets. The method can include forming a cylindrical retention structure sized to fit around the one or more magnetic materials and the one or more non-magnetic materials. The method can include forming the cylindrical retention structure via a casting process.

In some aspects, a method of forming a retention structure including magnetic regions and non-magnetic regions can include positioning one or more magnetic materials over one or more magnets of a rotor assembly. The method can include positioning one or more non-magnetic materials over one or more spacers. The spacers can be positioned between the one or more magnets. The method can include forming a cylindrical retention structure sized to fit around the one or more magnetic materials and the one or more non-magnetic materials. The method can include forming a plurality of spokes between the non-magnetic regions of the cylindrical retention structure and a central hub.

In some aspects the retention structure includes a shaped magnetic pole formed as a composite structure.

Numerous benefits are achieved by way of the present disclosure over conventional techniques. For example, embodiments of the present invention can provide methods and system for retaining magnets to a rotor assembly. These and other embodiments of the disclosure, along with many of its advantages and features, are described in more detail in conjunction with the text below and corresponding figures.

BRIEF DESCRIPTION OF THE DRAWINGS

Like reference, symbols in the various drawings indicate like elements, in accordance with certain example implementations. In addition, multiple instances of an element may be indicated by following a first number for the element with a letter or a hyphen and a second number.

DETAILED DESCRIPTION OF SPECIFIC EMBODIMENTS

Figure 1:
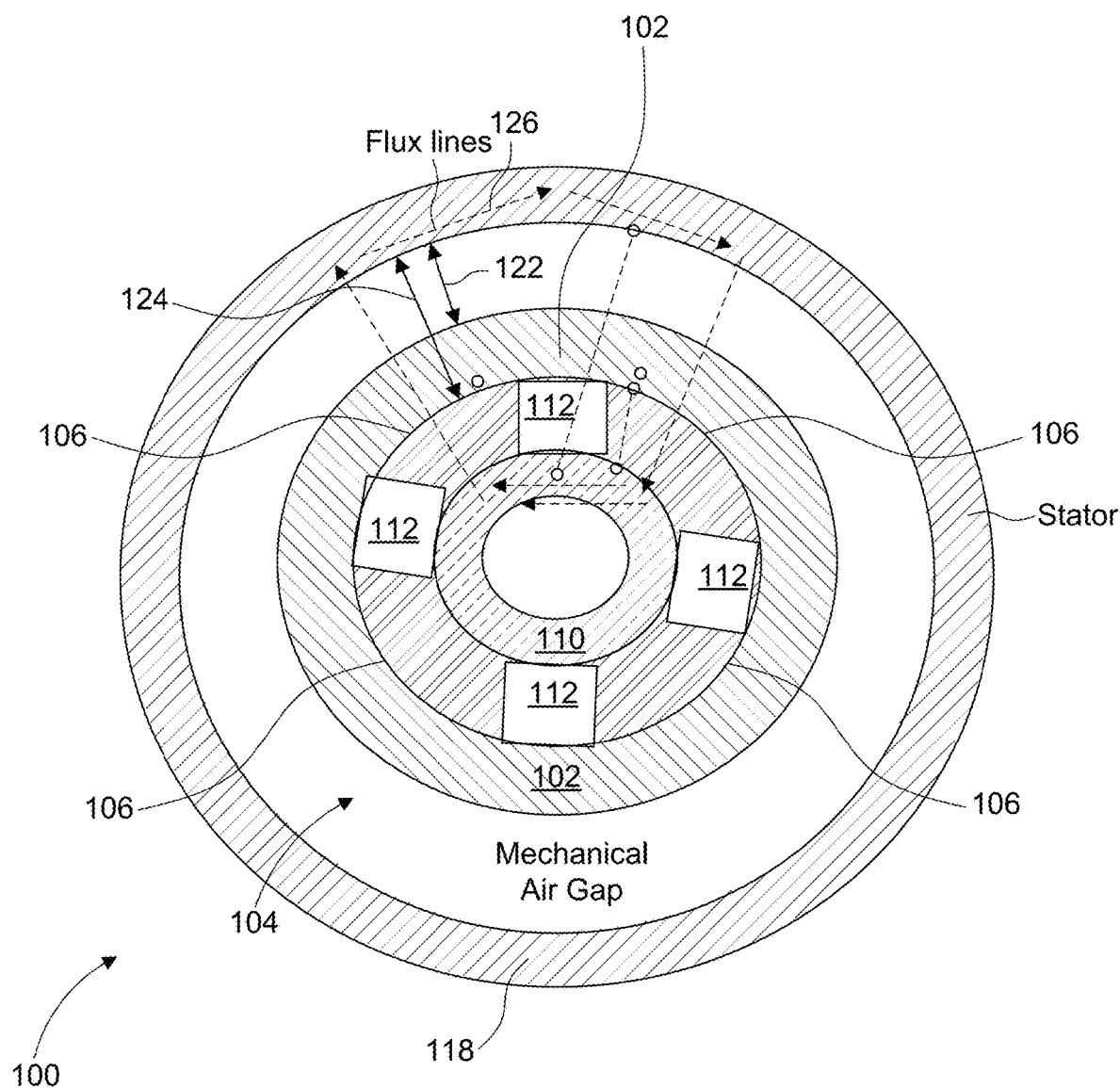
FIG. 1 illustrates a side view of a machine that incorporates an exemplary retention structure according to an embodiment of the present invention.

FIG. 1 illustrates a cross-sectional view of a machine 100 that incorporates an exemplary retention structure 102 according to an embodiment of the present invention. FIG. 1 illustrates a retention structure 102 of a rotor assembly 104 surrounding a plurality of magnets 106. The plurality of magnets 106 can be permanent magnets. Although four magnets 106 are illustrated in FIG. 1, the disclosure is not so limited and any number of magnets 106 can be used depending on the requirements of the machine and various design limitations. The rotor assembly 104 can be connected to a shaft 110 and can be configured to be inside a stator assembly 118 of the machine 100. The stator assembly 118 can include a plurality of magnets (e.g., electromagnets) surrounding the rotor assembly 104 to generate a magnetic field that interacts with the magnetic field of the magnets 106 of the rotor assembly 104.

The machine 100 can include a physical air gap 122, also referred to as a mechanical air gap. The physical air gap 122 can be formed by the space between the outer surface of the retention structure 102 and the inner surface of the stator assembly 118. The physical air gap 122 can be designed to meet certain system tolerances and to account for vibration of the rotor assembly 104. In various embodiments, the physical air gap 122 accounts for airflow through the machine 100 and does not interfere with bearing deflections of the rotor assembly 104.

The machine 100 can include a magnetic air gap 124. The magnetic air gap 124 is the distance between the outer surface of the magnets 106 and the inner surface of the stator assembly 118 and passes through the material of the retention structure 102 that has a permeability of one (e.g., air, fiberglass, carbon fiber, or non-magnetic materials). The magnetic flux 126 travels from the magnets 106, through the retention structure 102, through the physical air gap 122 to the stator assembly 118. As the magnetic air gap 124 increases, the magnetic flux 126 reaching the stator assembly 118 is decreased, which decreases the power and torque capabilities of the machine 100. Therefore, in machines in which the magnetic air gap 124 is increased, the size of the magnets 106 is typically increased to maintain a power or torque level of the machine 100. As the magnetic air gap 124 decreases, the magnetic flux 126 reaching the stator assembly 118 is increased, which conversely increases the magnetic flux 126 reaching the stator assembly 118.

In various machines without use of the retention structure 102, the magnets 106 can be affixed to the rotor assembly 104 using adhesive (e.g., glue). However, using adhesive alone will generally result in a machine that is not satisfactory for operation at high speeds due to forces placed on the magnets during operations, which may adversely impact the retention of magnets to the rotor assembly.

The retention structure 102 can be manufactured using magnetic materials or non-magnetic materials. In various example, the retention structure 102 can be a magnetic material (e.g., steel, or other alloy) or non-magnetic (e.g., Astralloy, or high nickel alloy (e.g., Inconel)). In cases in which the retention structure 102 is manufactured using non-magnetic materials, the magnetic air gap 124 is typically increased, which results in reductions in the power and/or torque capabilities of the machine 100.

In cases in which the retention structure 102 is magnetic in areas over spacers 112 (e.g., the entire retention structure 102 is magnetic), magnetic flux 126 from one magnet 106 can leak across the retention structure 102 to an adjacent magnet 106. This leaking across the retention structure 102 that is magnetic will not do any electromagnetic work with respect to the stator assembly 118. Thus, this leaking of the magnetic flux 126 can reduce the amount of magnetic flux 126 that reaches the magnetic regions of the stator assembly 118, thereby reducing the power and/or torque capabilities of the machine 100.

Figure 2A:
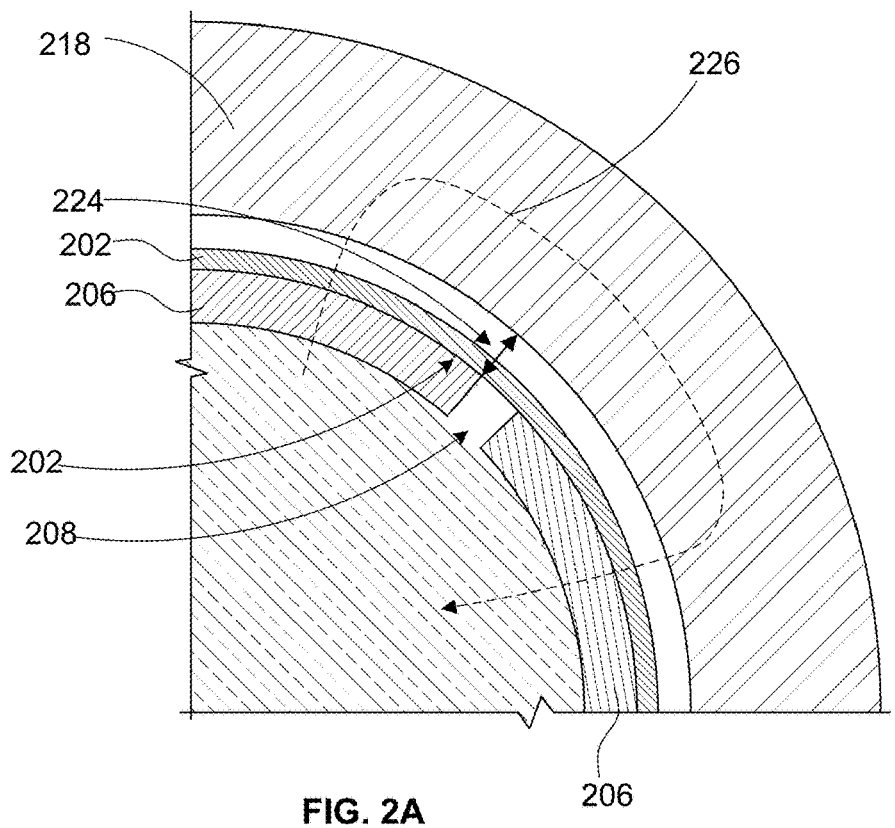
FIG. 2A illustrates a profile view of a machine that incorporates a non-magnetic retention hoop.

FIG. 2A illustrates a profile view of a conventional designed machine that incorporates a non-magnetic retention hoop 202. FIG. 2A illustrates magnets 206 retained to a rotor by the non-magnetic retention hoop 202. As the magnets 206 rotate through the magnetic field generated by the stators 218 flux lines 226 are generated. The magnetic field from the magnets 206 travel through the non-magnetic retention hoop 202. FIG. 2A illustrates a magnetic air gap 224 between the magnets 206 and the stators 218. As illustrated in FIG. 2A, an air gap exists between the magnets 206.

Figure 2B:
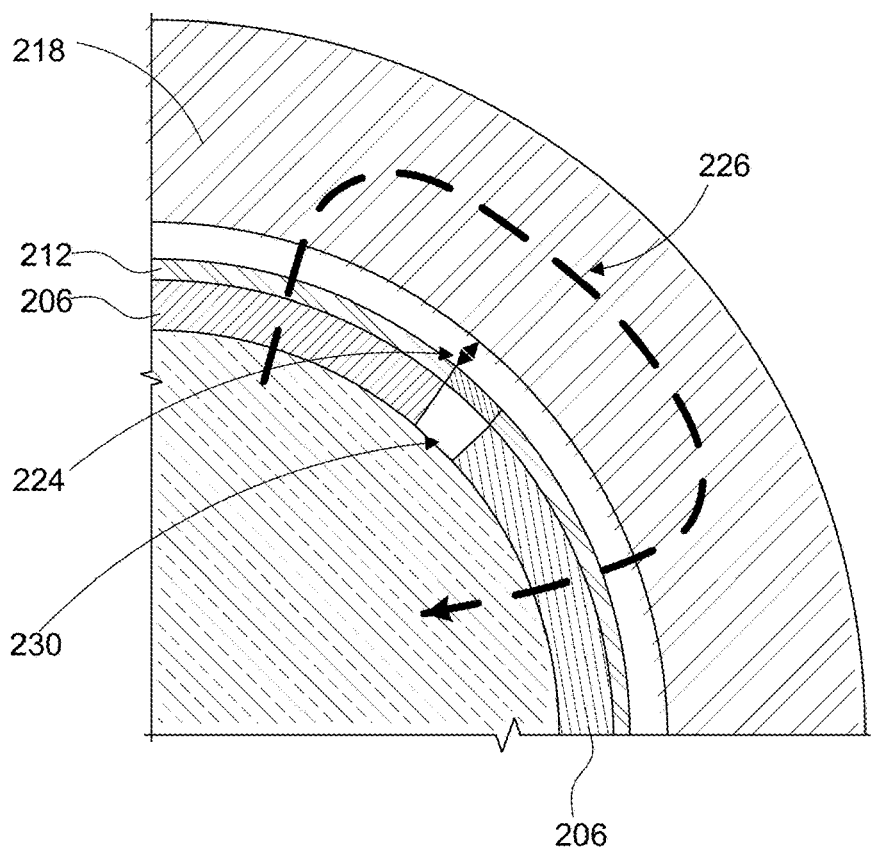
FIG. 2B illustrates a profile view of a machine that incorporates a multi-metallic retention hoop.

FIG. 2B illustrates a profile view of a machine that incorporates a multi-metallic retention hoop 212. FIG. 2B illustrates magnets 206 retained to a rotor by the non-magnetic retention hoop 212. As the magnets 206 rotate through the magnetic field generated by the stators 218 flux lines 226 are generated. As illustrated in FIG. 2B, an air gap 230 exists between the magnets 206. The magnetic field from the magnets 206 travel through the multi-metallic retention hoop 212. FIG. 2B illustrates a magnetic air gap 224 between the multi-metallic retention hoop 212 and the stators 218. In FIG. 2B, the magnetic air gap 224 is reduced as compared to the convention design as illustrated in FIG. 2A. In FIG. 2A, the magnetic air gap 224 begins at an outside surface of the magnets 206. In FIG. 2B the magnetic air gap 224 begins on an outside edge of the multi-metallic retention hoop 212. The reduction of the magnetic air gap 224 increased the strength of the magnetic flux lines 226. The power of the machine can be increased when the strength of the magnetic flux lines 226 are increased.

Figure 3:
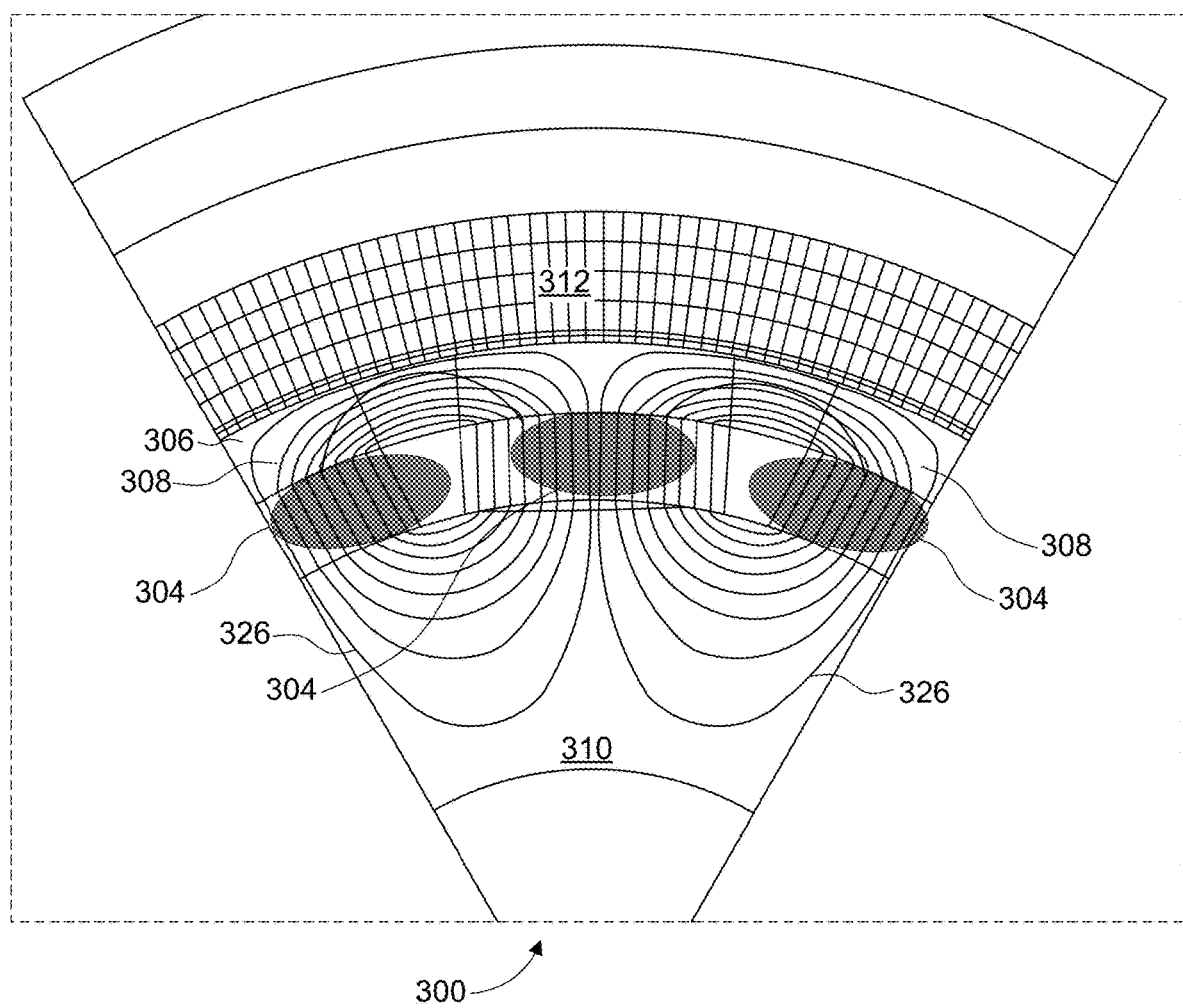
FIG. 3 illustrates a first magnetic flux diagram illustrating flux leakage with a fully magnetic hoop.

FIG. 3 illustrates a view of a first magnetic flux diagram 300 for a machine configure to generate a magnetic field as magnets 304 retained by a metallic hoop retention structure 308 having a magnetic portion between the magnets 304. The metallic hoop retention structure 308 can be shrunk onto and around the magnets 304 (e.g., similar to a rubber band around the outside of several items). Magnetic flux lines 326 are generated as the magnets 304 pass through a magnetic field generated by a stator assembly 312. FIG. 3 illustrates an air gap 306 between the metallic hoop retention structure 308 and the stator assembly 312. As illustrated in FIG. 3, the magnetic flux lines 326 exhibit leaking magnetic flux between the magnets 304 reducing the overall strength of the magnetic flux lines 326 generated by the machine. The leakage of magnetic flux can reduce the amount of magnetic flux that reaches the magnetic regions of the stator assembly 312, thereby reducing the power and/or torque capabilities of the machine.

Figure 4:
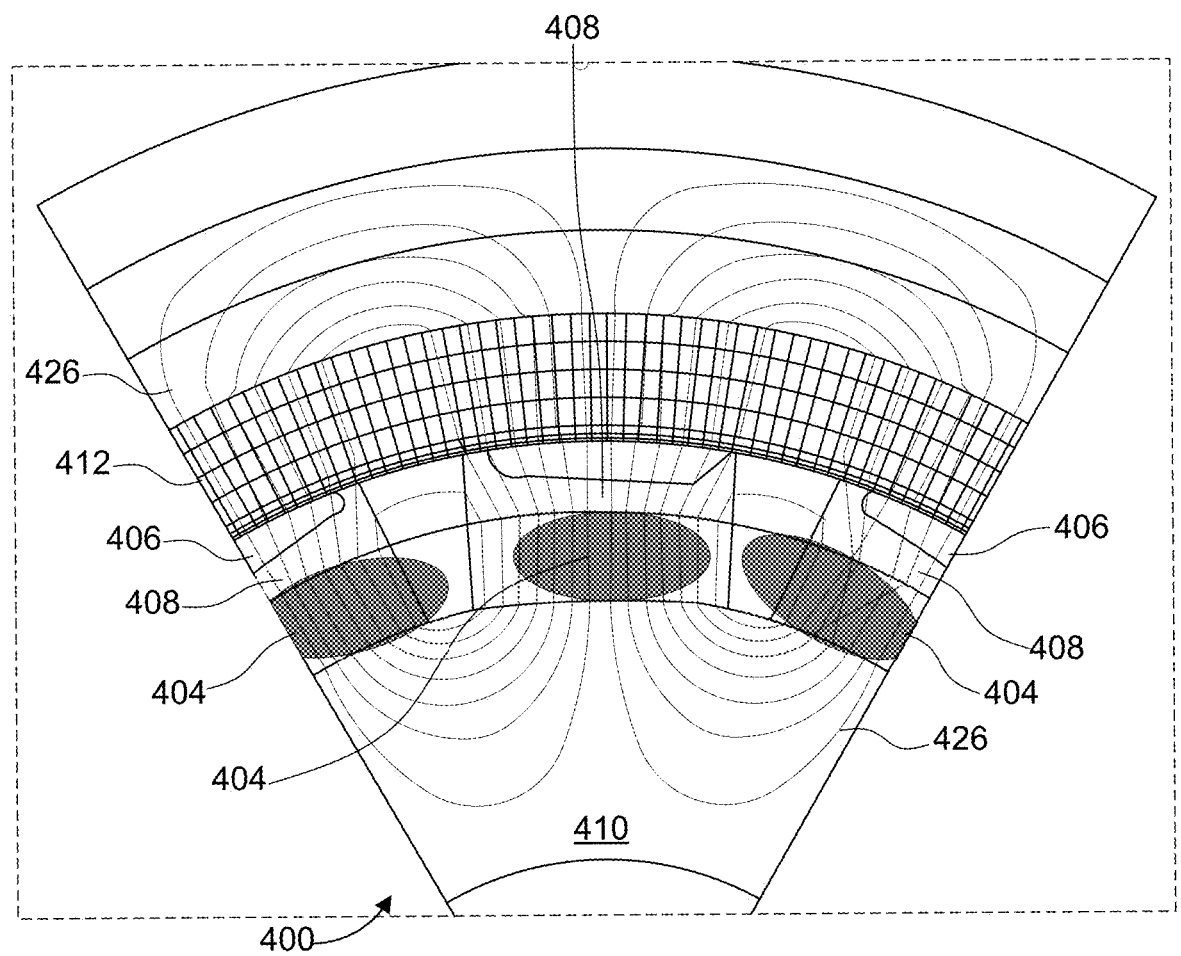
FIG. 4 illustrates a second magnetic flux diagram of a machine including a multi-metallic retention hoop having non-magnetic portions between magnets.

FIG. 4 illustrates a view of a second magnetic flux diagram 400 for a machine configure to generate a magnetic field as magnets 404 retained by a metallic hoop retention structure 408 having non-metallic portions between the magnets. The metallic hoop retention structure 408 can be shrunk onto and around the magnets 404. Magnetic flux lines 426 are generated as the magnets 404 passes through a magnetic field generated by a stator assembly 412. FIG. 4 illustrates an air gap 406 between the metallic hoop retention structure 408 and the stator assembly 412. As illustrated in FIG. 4, the magnetic flux no longer circulates across retention structure 402, but instead crosses the air gap 406, linking flux with stator assembly 412 and thereby increasing the power capability of the machine.

Figure 5:
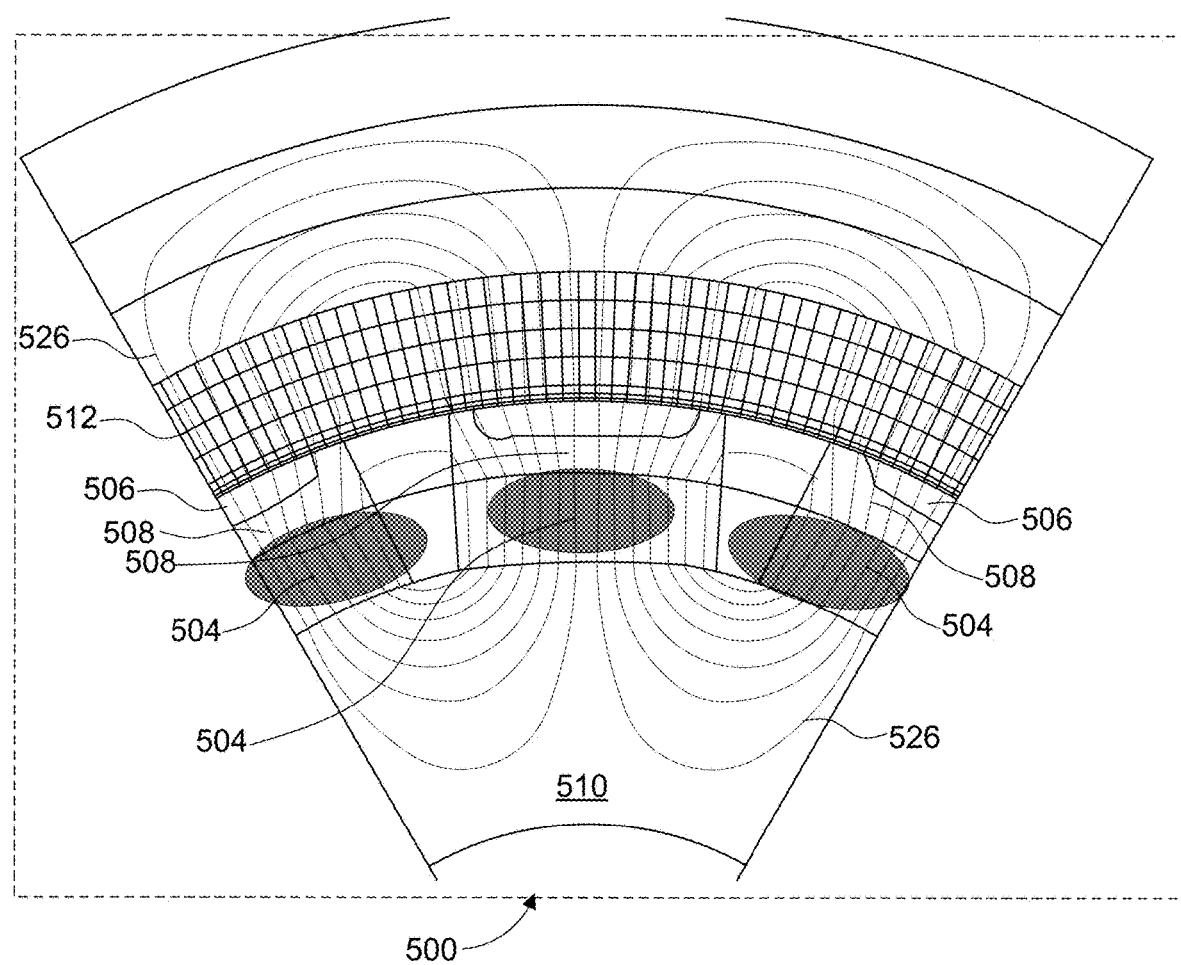
FIG. 5 illustrates a third magnetic flux diagram of the same machine present in FIG. 4, except that magnet retention structure has been replaced with air between the magnets.

FIG. 5 illustrates a view of a second magnetic flux diagram 500 for a machine configure to generate a magnetic field as magnets 504 retained by a metallic hoop retention structure 508 having air between the magnets. FIG. 5 illustrates that the multi-metallic hoop appears to have the same or similar flux leakage properties as just air. The metallic hoop retention structure 508 is connected to the rotor hub 510. Magnetic flux lines 526 are generated as the magnets 504 passes through a magnetic field generated by a stator assembly 512. FIG. 5 illustrates an air gap 506 between the metallic hoop retention structure 508 and the stator assembly 512. As illustrated in FIG. 5, the magnetic flux no longer circulates across retention structure 502 as illustrated in FIG. 3, but instead crosses the air gap 506, linking flux with stator assembly 512 and thereby increasing the power capability of the machine.

Figure 6:
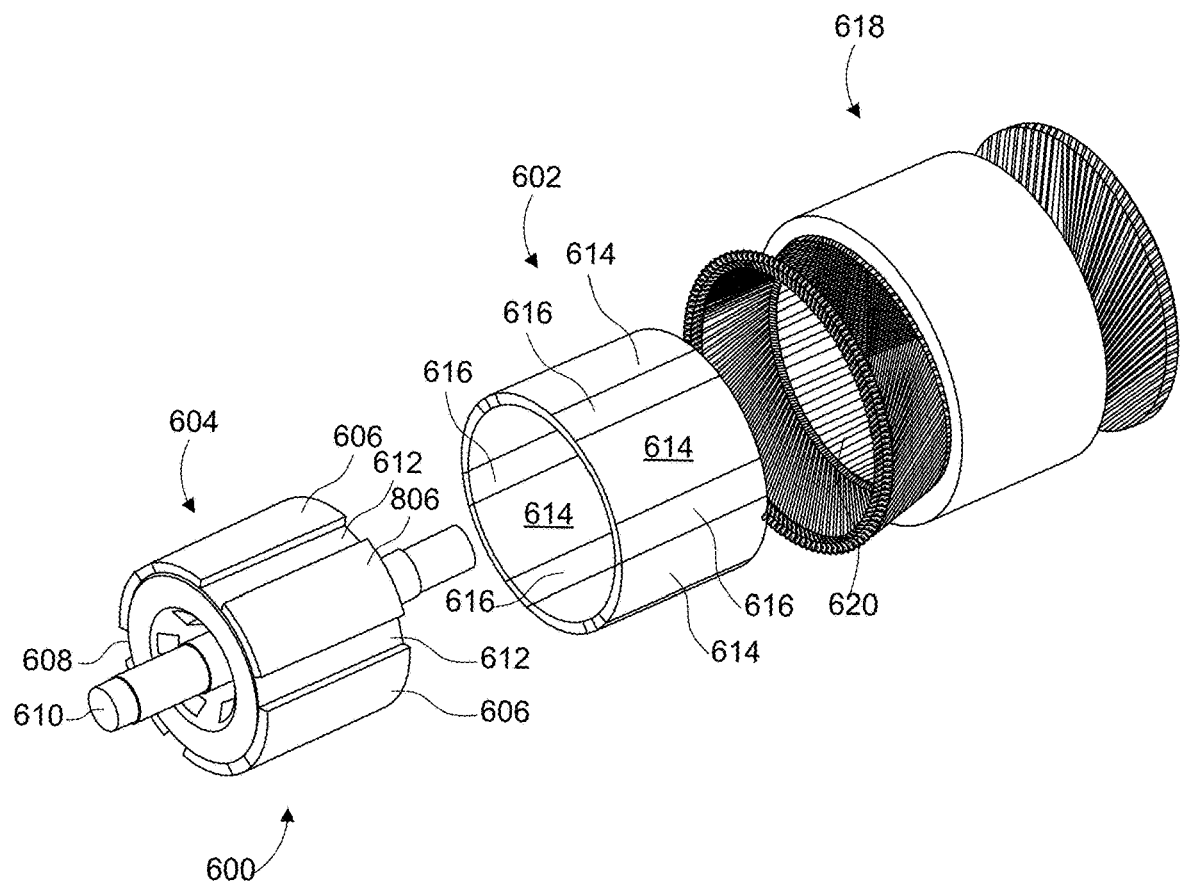
FIG. 6 illustrates a perspective view of a machine that incorporates an exemplary retention structure according to an embodiment of the present invention.

FIG. 6 illustrates a perspective view of a machine 600 that incorporates an exemplary retention structure 602 according to an embodiment of the present invention. In various embodiments the machine can be an electric motor. The retention structure 602 can be configured to fit over a rotor assembly 604 of the machine 600. The rotor assembly 604 can include a plurality of magnets 606. The rotor assembly 610 can include a pole retention structure 608 onto which a plurality of magnets 606 can be mounted. The pole retention structure 608 can be connected to the shaft 610. The magnets 606 can be dispersed on a surface of the pole retention structure 608. Spaces 612, which can be empty or filled with a non-magnetic material, can exist between adjacent magnets 606.

A retention structure 602 can include magnetic regions 614 and non-magnetic regions 616. The retention structure 602 be created using two or more different materials (e.g., one magnetic material, and one non-magnetic material). The two or more different materials can be formed as a homogenous structure. The retention structure 602 can be formed as a hoop with one or more magnetic regions 614 tangentially alternating with one or more non-magnetic regions 616 configured to surround and retain a plurality of magnets 606 of a rotor assembly 604. The one or more magnetic regions 614 can be aligned with each one of the plurality of magnets 606. The one or more non-magnetic regions 616 can be aligned with one or more spaces 612 between the plurality of magnets 606 on the rotor assembly 604. The magnetic materials can allow flux from the permanent magnets 606 to flow through to the stators 620 in the stator structure 620. The non-magnetic regions 616 can reduce leakage of magnetic flux to adjoining permanent magnets 606 through use of non-magnetic materials. The retention structure 602 can be constructed using various materials, including materials that are cast using a hot isostatic pressing (HIP) process, composite materials (e.g., carbon fiber or fiberglass materials), a metallic (e.g., steel, or other alloy) cylinder, a non-magnetic cylinder, or other materials.

The magnetic regions can include a ferromagnetic powdered metal, also referred to as a permeable or magnetic material. The ferromagnetic powder material may be a soft ferromagnetic powdered metal. In an embodiment of the present invention, the ferromagnetic powdered metal includes nickel, iron, cobalt, or an alloy thereof.

In a particular embodiment of the present invention, the non-ferromagnetic powder metal is austenitic stainless steel, such as SS316. In general, the AISI 300 series stainless steels are non-magnetic and may be used in embodiments of the present invention. Also, the AISI 8000 series steels are non-magnetic and may be used. One of ordinary skill in the art would recognize many variations, modifications, and alternatives.

In various embodiments, a retention structure 602 can form a cylindrical hoop that can provides a continuous magnetic air gap 124, as shown in FIG. 1, between the plurality of magnets 606 and one or more magnetic regions 614 of the stator assembly 618 while reducing magnetic flux leakage across the one or more non-magnetic regions 616. In various embodiments, the one or more magnetic regions 614 and the one or more non-magnetic regions 416 can form staves of the retention structure 602.

In addition to retaining the plurality of magnets 606 to the pole retention structure 608 against the radial and tangential forces generated by the rotating rotor assembly 604, the retention structure 602 can be sized to provide a pre-loaded force to the plurality of magnets 606 of the rotor assembly 604.

Figure 7:
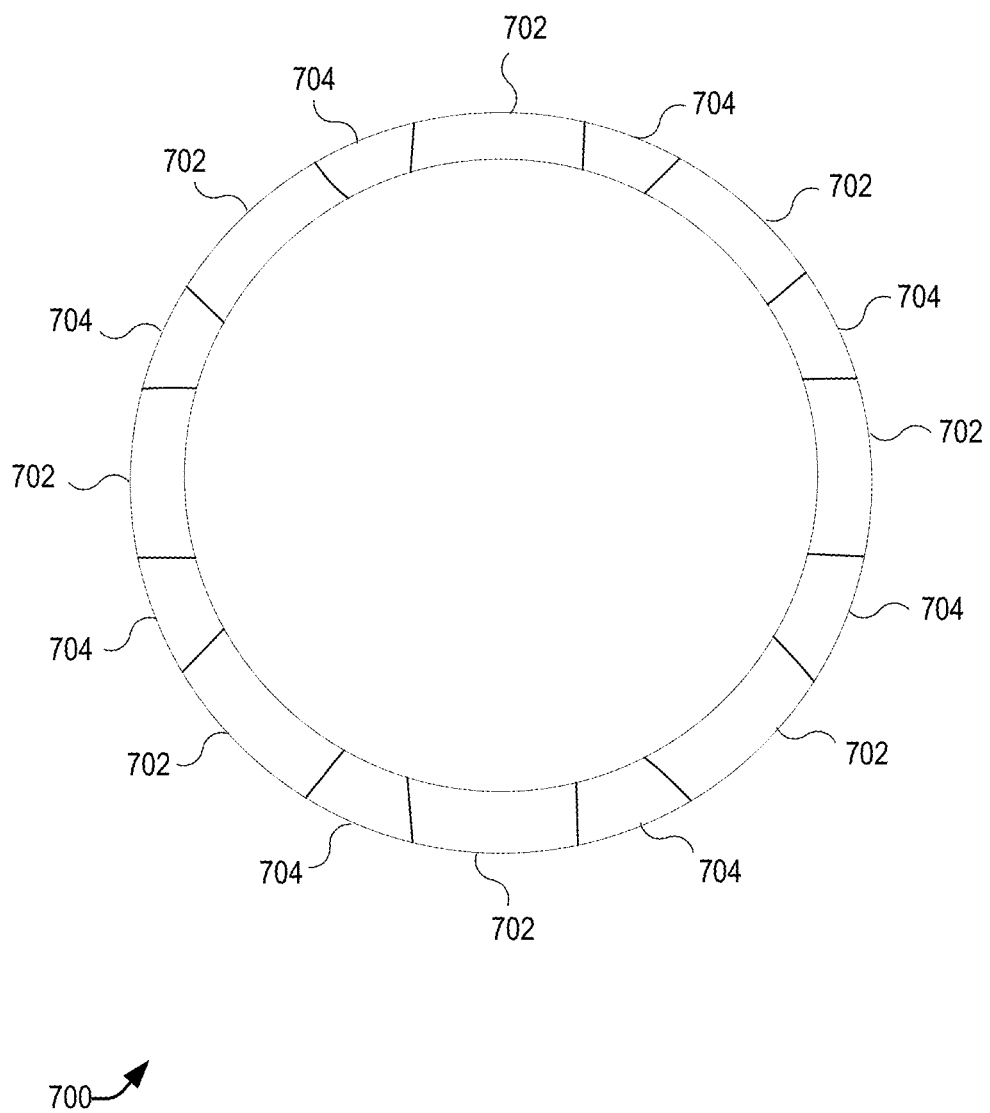
FIG. 7 illustrates a side view of a first embodiment of an exemplary retention structure according to an embodiment of the present invention.

FIG. 7 illustrates a side view of a first embodiment of an exemplary first retention structure 700 according to an embodiment of the present invention. The first retention structure 700 can include alternating magnetic regions 702 and non-magnetic regions 704. The first retention structure 700 can be a continuous structure. The number of magnetic regions 702 and non-magnetic regions 704 is merely illustrative and not a limitation. The first retention structure 700 does not require magnetic saturation of some portion of the structure and does not consume the magnetic air gap. In various embodiments, the first retention structure 700 can have a cylindrical inner and outer surface.

Figure 8:
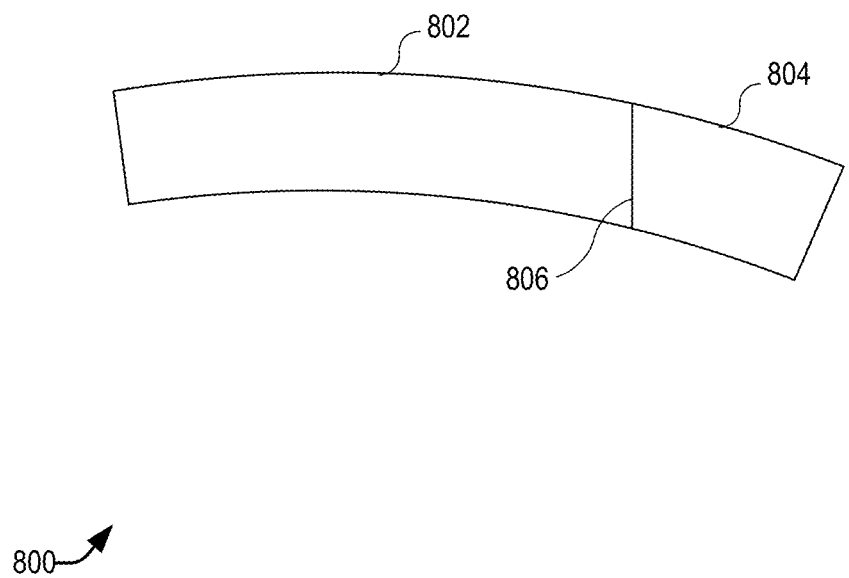
FIG. 8 illustrates a side view of a portion of a first embodiment of an exemplary retention structure according to an embodiment of the present invention.

FIG. 8 illustrates a side view of a portion 800 of a first embodiment of an exemplary retention structure according to an embodiment of the present invention. In various embodiments, the retention structure can be comprised of two different materials. For example, a first material 802 can have magnetic properties and a second material 804 can have non-magnetic properties. In various embodiments the first material 802 can be fabricated from suitable magnetic materials, including, but not limited to, magnetic steel and the second material 804 can be fabricated from suitable non-magnetic materials, including, but not limited to, Astralloy or Inconel. A bond line 806 can exist between the first material 802 (e.g., a magnetic material) and the second material 804 (e.g., non-magnetic material).

Figure 9:
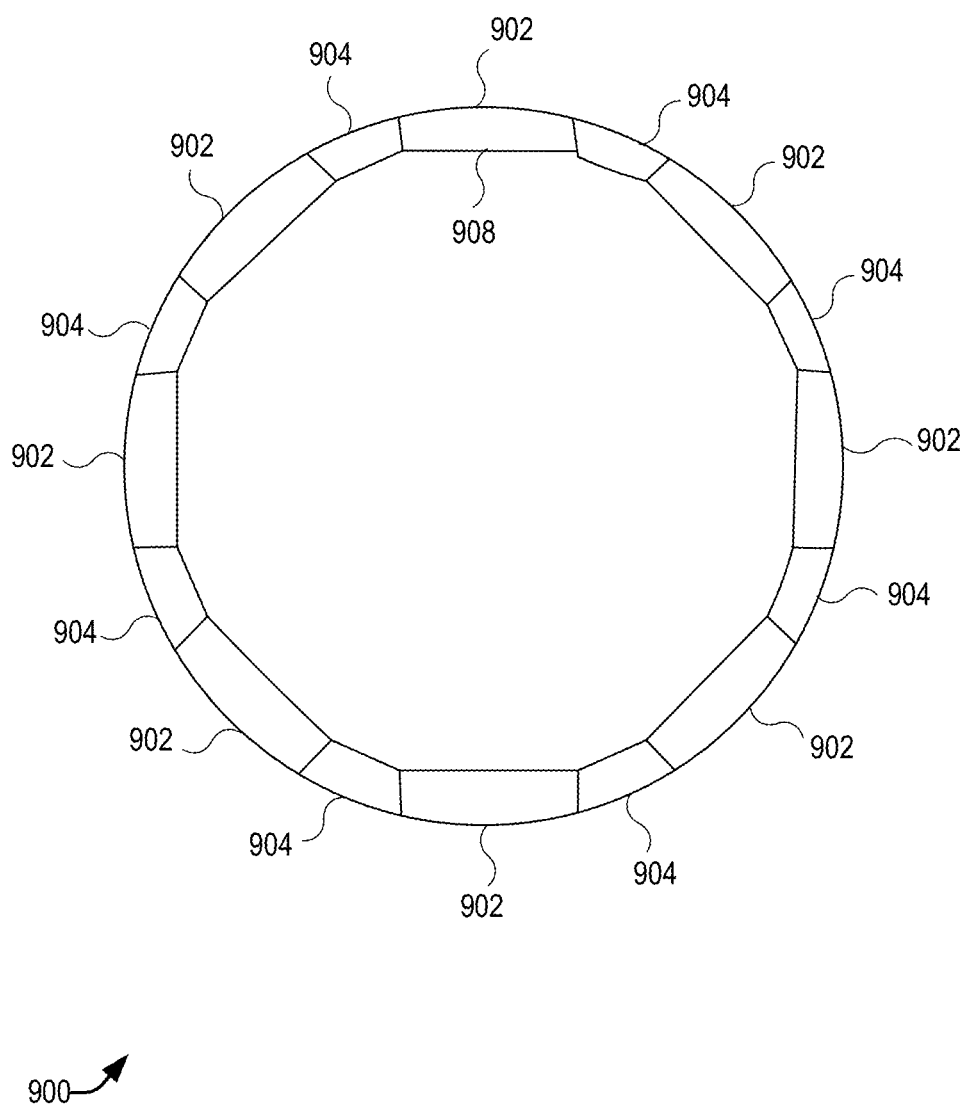
FIG. 9 illustrates a side view of a second embodiment of an exemplary retention structure according to an embodiment of the present invention.

FIG. 9 illustrates a side view of an embodiment of a second exemplary retention structure 900 according to an embodiment of the present invention. In various embodiments, the retention structure 900 can be comprised of two different materials. For example, a first material 902 can have magnetic properties and a second material 904 can have non-magnetic properties. As shown in FIG. 9, the first material 902 can have a flat inner surface 908. The flat inner surface 908 allows for retention of rectangular magnets.

Figure 10:
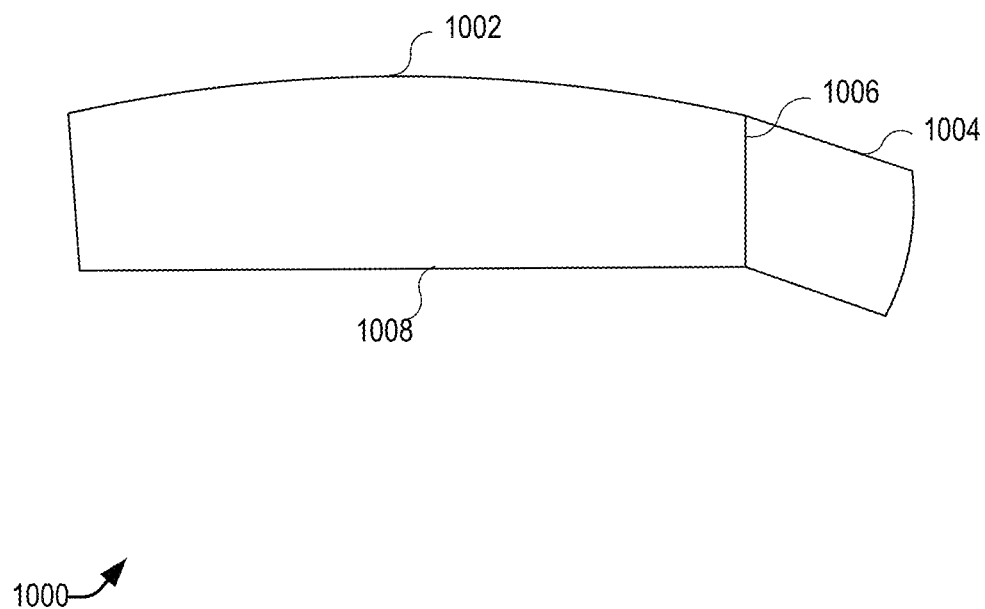
FIG. 10 illustrates a side view of a portion of a second embodiment of an exemplary retention structure according to an embodiment of the present invention.

FIG. 10 illustrates a side view of a portion 1000 of a second embodiment of an exemplary retention structure according to an embodiment of the present invention. In various embodiments, the retention structure can be comprised of two different materials. For example, a first material 1002 can have magnetic properties and a second material 1004 can have non-magnetic properties. In various embodiments, the first material 1002 can include, but is not limited to, magnetic steel and the non-magnetic material can include, but is not limited to, Astralloy or Inconel. A bond line 1006 can exist between the first material 1002 (e.g., a magnetic material) and the second material 1004 (e.g., non-magnetic material). As shown in FIG. 10, the first material 1002 can have a flat inner surface 1008. The flat inner surface 1008 allows for retention of rectangular magnets.

Figure 11:
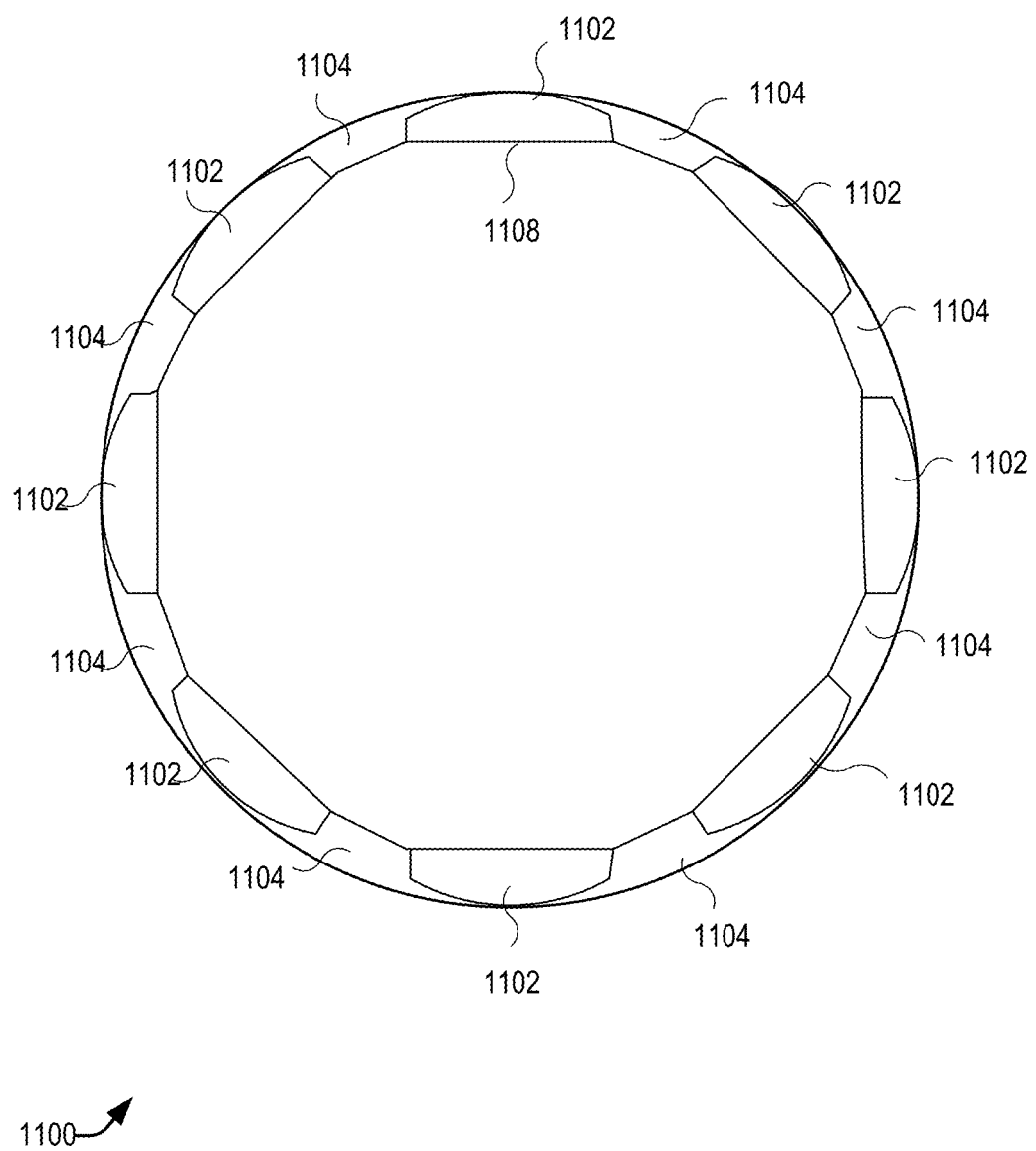
FIG. 11 illustrates a side view of a third embodiment of an exemplary retention structure according to an embodiment of the present invention.

FIG. 11 illustrates a side view of a third embodiment of an exemplary retention structure according to an embodiment of the present invention. In various embodiments, the retention structure 1100 can be formed using two different materials. For example, a first material 1102 can have magnetic properties and a second material 1104 can have non-magnetic properties. As shown in FIG. 11, the first material 1102 can have a flat inner surface 1108. The flat inner surface 1108 allows for retention of rectangular magnets. Rectangular magnets are often less expensive than curved or shaped magnets. As shown in FIG. 11, the first material 1102 can be shaped. For example, in various embodiments, the first material 1102 can be formed with a crowned exterior surface to modify the shape of magnetic flux lines linking with the stator.

Figure 12:
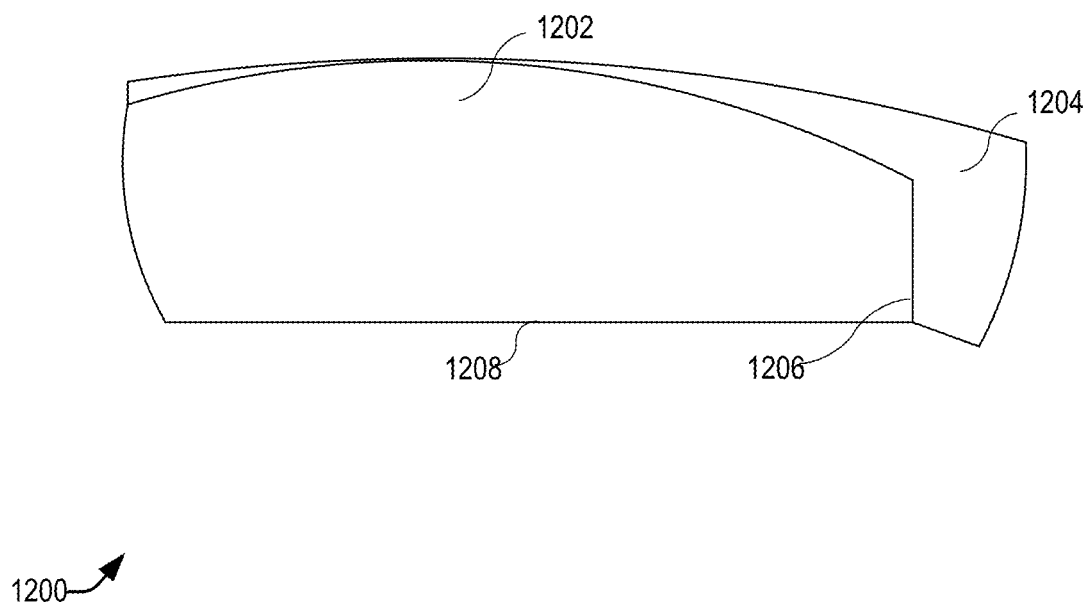
FIG. 12 illustrates a side view of a portion of a third embodiment of an exemplary retention structure according to an embodiment of the present invention.

FIG. 12 illustrates a side view of a portion of a third embodiment of an exemplary retention structure according to an embodiment of the present invention. In various embodiments, the retention structure 1200 can be formed using two different materials. For example, a first material 1202 can have magnetic properties and a second material 1204 can have non-magnetic properties. In various embodiments, the first material 1202 can include, but is not limited to, magnetic steel and the non-magnetic material can include, but is not limited to, Astralloy or Inconel. A bond line 1206 can exist between the first material 1202 and the second material 1204. As shown in FIG. 12, the first material 1202 can have a flat inner surface 1208. The flat inner surface 1208 allows for retention of rectangular magnets. As shown in FIG. 12, the first material 1202 can be shaped. For example, in various embodiments, the first material 1202 can be formed with a crowned exterior surface to shape the flux lines produced by the magnet.

In various embodiments, the retention structure can be welded together. However, welding has disadvantages for high-speed applications (e.g., for rotor assemblies) because the welds can crack, or components can come lose. In various embodiments, the structure can be a composite structure. In other embodiments, the structure can be formed using a three-dimensional (3D) printing process. In various embodiments, the structure can use 3D printing and then go through a HIP process.

Figure 13:
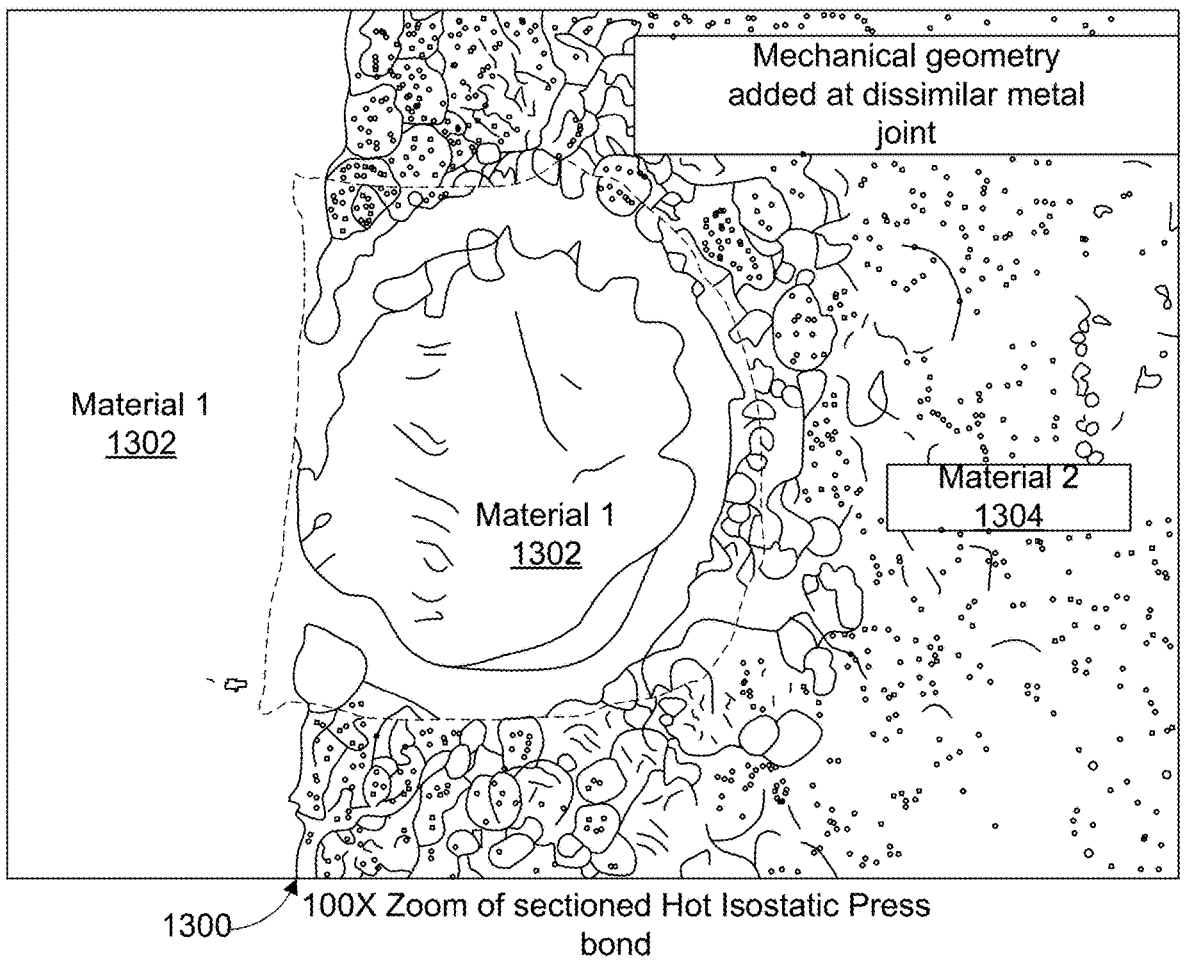
FIG. 13 illustrates a first exemplary diagram of a material locking feature at a material bond line.

FIG. 13 illustrates a joint 1300 between two dissimilar metals for a hot isostatic press bond. FIG. 13 is an exemplary 100 times zoom of a sectioned Hot Isostatic Press bond. Hot Isostatic Pressing (HIP), is one of material processing methods, which compresses materials by applying high temperature of several hundreds to exceeding 2000° C. and isostatic pressure of several tens to 200 MPa at the same time. Argon can be used as a pressure medium. For processing castings, metal powders can also be turned to compact solids by this method, the inert gas is applied between 7,350 psi (50.7 MPa) and 45,000 psi (310 MPa), with 15,000 psi (100 MPa) or above being most common. Process soak temperatures can range from 900° F. (482° C.) for aluminum castings to 2,400° F. (1,320° C.) for nickel-based superalloys. When castings are treated with HIP, the simultaneous application of heat and pressure eliminates internal voids and microporosity through a combination of plastic deformation, creep, and diffusion bonding; this process improves fatigue resistance of the component. Primary applications are the reduction of micro shrinkage, the consolidation of powder metals, ceramic composites, and metal cladding. Hot isostatic pressing can also be used as part of a sintering (powder metallurgy) process and for fabrication of metal matrix composites, often being used for postprocessing in additive manufacturing A first material 1302 can be joined with a second material 1304. In various embodiments, a portion of the first material 1302 can be introduced into a portion of the second material 1304. FIG. 13 illustrates an exemplary geometry in which the extension of the first material 1302 that extends into and is at least partially surrounded by the second material 1304. This type of geometry can strengthen the bond between the first material 1302 and the second material 1304. Other geometries can be used such as a rectangular section. By introducing a feature in the bond line it changes how the two materials interact with the bond line. The protruding feature is absorbing the bending stress due to the mismatch in material strain rates. The features do not need to be locking.

The powered material can form tabs that can be inserted into blanks that can be similar to the tabs and blanks of a jigsaw puzzle. The tab/blank connection can increase the strength between the dissimilar materials.

Figure 14:
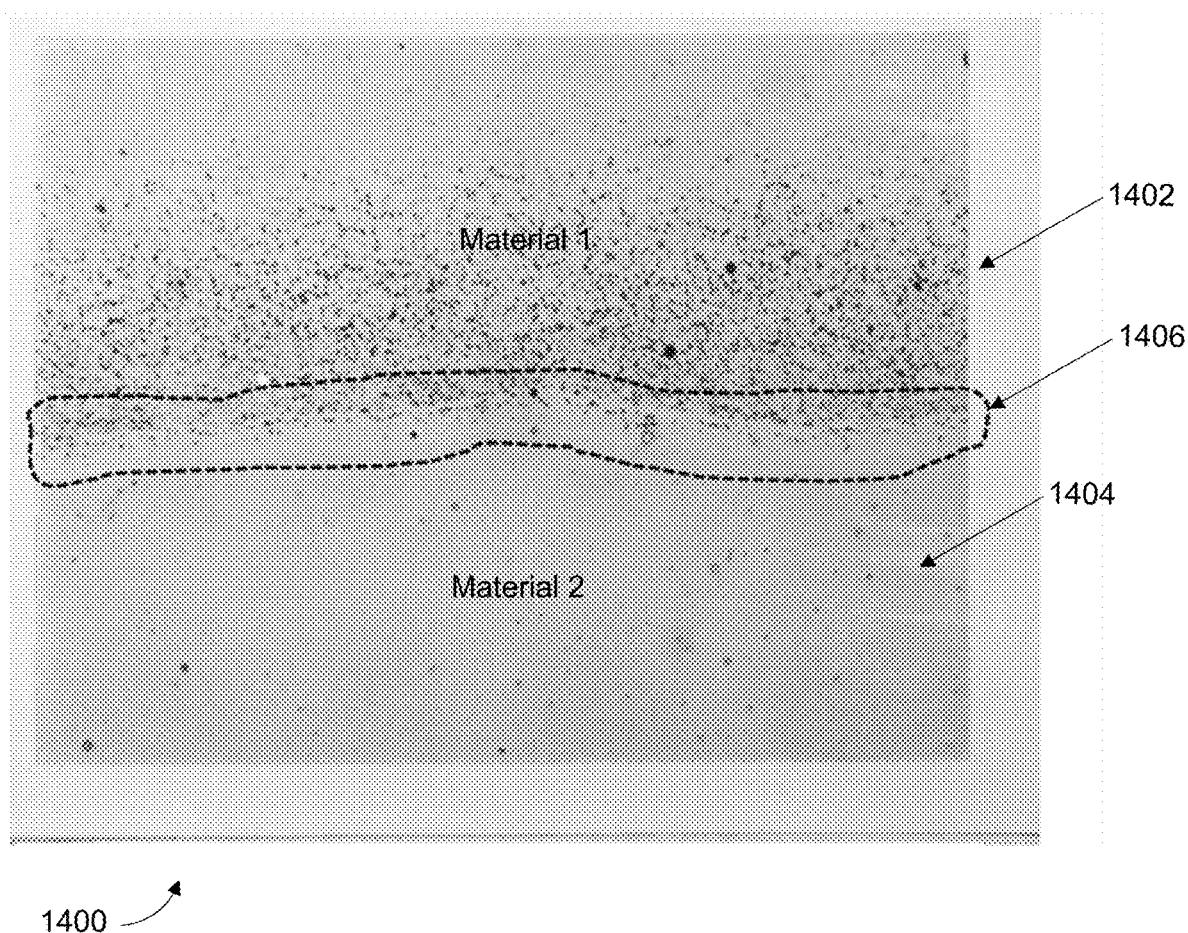
FIG. 14 illustrates a second exemplary diagram of a structural enhancing feature at a material bond line.

FIG. 14 illustrates a second exemplary diagram of a structural enhancing feature at a material interface 1400. FIG. 14 illustrates an enhancement of material features at the bond line. A first material 1402 can be bonded with a second material 1404 using a third material 1406 at the bond line. In an example, the first material 1402 can be a non-magnetic material. The second material 1404 can be a magnetic material. The third material 1406 can be a material different from the first material 1402 and the second material 1404. The third material can stop carbide precipitation across the bond line. This would enhance the structure joint at the bond line. Flux leakage can be reduced due to tangentially non-continuous magnetic permeability.

Figure 15:
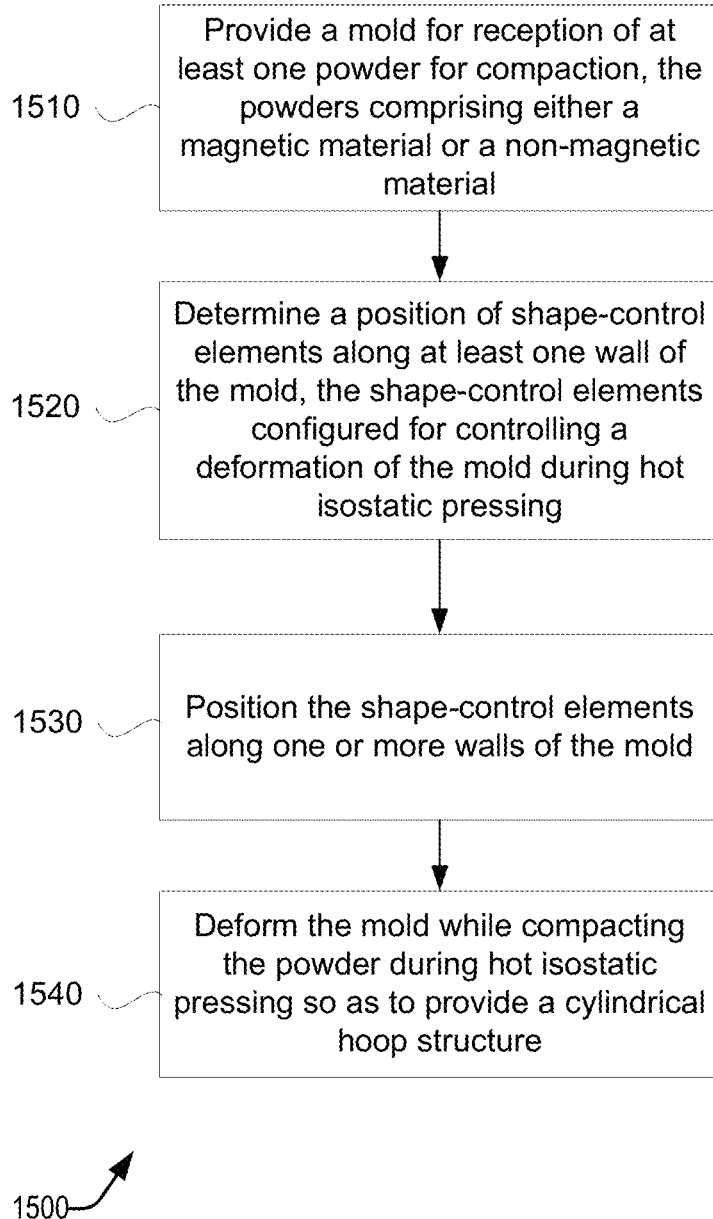
FIG. 15 illustrates a flow chart for a process for manufacturing a multi-metallic retention structure according to an embodiment of the present invention.

FIG. 15 illustrates a flow chart for a process for manufacturing a multi-metallic retention structure using Hot isostatic pressing (HIP) according to an embodiment of the present invention. HIP is a manufacturing process used to reduce the porosity of metals and increase the density of many ceramic materials. This improves the material's mechanical properties and workability. HIP is a process using high pressure and temperature over a set time to improve material properties. The HIP process can form a composite structure in which two or more dissimilar materials can be bonded together. The HIP process can control parameters (e.g., temperature and pressure) to yield the desired material properties in the composite structure. In an exemplary process, a furnace located inside a pressure vessel is pressurized with argon. The uniform pressure and elevated temperature allow for desiccation and elimination of any product defects while at the same time improving the mechanical properties. In addition to removing defects, the process can also be used to layer materials together or even consolidate powders into solid form, resulting in an improved product than that obtained with traditional methods.

HIP processing uses metal powders (e.g., nickel, chromium, cobalt, and iron) that can be fabricated into structures having uniform composition and dense microstructure having improved toughness, strength, fracture resistance, and thermal expansion coefficients. Such improved properties can be particularly valuable in the fabrication of e.g., rotary components for a turbine where high temperatures and/or high stress conditions exist.

Typically, the metal powders can be placed into a container (sometimes referred to as a "can") that has been sealed and its contents placed under a vacuum. The container is also subjected to an elevated temperature and pressurized on the outside using an inert gas such as e.g., argon to avoid chemical reaction. The hot isostatic pressing cycle uses temperature of up to and exceeding 1200° C. and a pressure of up to and exceeding 150 MPa. By pressurizing the container that is enclosing the powder, the selected fluid medium (e.g., an inert gas) applies pressure to the powder at all sides and in all directions.

FIG. 15 is a flow chart of an example process 1500 for fabricating a retention structure according to an embodiment of the present invention. In some implementations, one or more process blocks of FIG. 15 can be performed by a HIP fabrication system. In some implementations, one or more process blocks of FIG. 15 can be performed by another device, or a group of devices separate from or including the HIP fabrication system.

The method can include providing a mold for reception of at least one powder for compaction (1510). The powder can include either magnetic and non-magnetic materials, or some combination thereof. The magnetic materials can include various metals, or metal alloys. The molds can be shaped to produce a cylindrical structure.

The mold can include a top, a bottom, and outer wall. In an exemplary embodiment, the mold may be constructed of conventional materials as an austenitic stainless steel such as 304SS. The top, bottom, and outer wall can be constructed as a single piece. However, mold may include other constructions as well including constructions where top, bottom, and outer wall are created as one or more separate components. Sliding cores, ejectors, and other moving components can be incorporated in the mold when necessary to form the different material regions of the composite sleeve.

The method can include determining a position of shape-control elements along at least one wall of the mold (1520). The shape-control elements can be positioned for controlling a deformation of the mold during hot isostatic pressing.

The mold can also include one or more diffusion barriers. The diffusion barriers can be used to separate the various powders from each other or from the mold top, bottom, or outer wall. A diffusion barrier operates to prevent diffusion and is positioned as a layer or inner liner on mold located between the various powder metals and the mold itself. Diffusion barriers can prevent or minimizes the migration of elements from various powder layers or between the powders and the mold or from the mold into the powders.

Diffusion barriers can be constructed from one or more materials specifically selected to prevent the diffusion process. A variety of materials may be used depending upon the composition of powders, the mold, and the conditions of the HIP process. For example, the diffusion barrier could be constructed from various metal nitrides, sulfides, carbides, carbon nitrides or metal oxides. Ceramic material may also be used. In certain applications, diffusion barrier may be constructed from a metal alone such as e.g., tantalum, gold, silver, or copper. Other materials may be applied as well.

A variety of techniques may be used to position diffusion barrier along the inside of mold. Diffusion barriers may, for example, be constructed of a metal foil that is placed along the inside of the mold. The foil could be specifically constructed according to the geometry of the mold or could be applied as overlapping sheets before placement of powder into the mold or between various layers of powder. For example, a diffusion layer may be placed between the metallic and non-metallic layers. Various plating techniques could also be used to deposit diffusion barrier upon the interior of mold. For example, electroplating or electroless plating could be used to deposit the desired thickness of barrier material as a layer upon the mold. Chemical vapor deposition can also be used to deposit materials of the desired thickness on mold to create a diffusion barrier. A ceramic coating could also be applied through a variety of techniques including plasma spraying. Using the teachings disclosed herein, one of skill in the art will understand that various other methods may also be used to apply the diffusion barrier.

In various embodiments, the process 1500 can include inserting a boundary material between the magnetic regions and the non-magnetic regions. The boundary material can block carbon transfer during the hot isostatic pressing.

In various embodiments, the process 1500 can include forming a mechanical geometry joint at a boundary between the magnetic regions and the non-magnetic regions.

In various embodiments, the diffusion barrier can be used to shape the magnetic and non-magnetic regions of the retention structure. For example, the magnetic region can be shaped to improve the magnetic flux to the stator assembly. In various embodiments, the magnetic region can be formed in a shape of a crown.

By shaping the metallic region of the retention structure allows for shaping the flux of the pole to obtain a more sinusoidal electric machine that has less torque ripple. This can provide better power quality with less noise.

In various embodiments, divider sheets (e.g., plastic materials) can be used to separate the various materials in the structure. Prior to the HIP process the divider sheets can be removed so the powered materials will touch but will not mix.

In various embodiments, a portion of the structure can be formed of a solid metal with various other materials formed to the solid metal during a HIP process. In various embodiments, the magnetic regions can be formed using a solid material and the non-magnetic regions can be formed using the one or more powder comprising the non-magnetic material. In various embodiments, the non-magnetic regions can be formed using a solid material and the magnetic regions can be formed using the one or more power comprising magnetic material. In various embodiments, the non-magnetic regions and the magnetic regions can be formed using the powder including the magnetic material and the non-magnetic materials. In various embodiments the non-magnetic regions and the magnetic regions can be formed using solid materials The method can include positioning the shape-control elements along one or more walls of the mold (1530). The various shape control elements can shape the retention structure to fit around the rotor assembly. In various embodiments, the shape control elements can be used to shape the exterior of the retention structure. In various embodiments, the exterior structure may have a smooth continuous exterior to reduce vibration. In various embodiments, the interior surface may be shaped to accommodate rectangular magnets.

The method can include deforming the mold while compacting the powder during hot isostatic pressing to provide a cylindrical hoop structure (1540). The mold can be placed within a pressure vessel which is evacuated and filled with an inert gas such as Argon during the HIP process.

Process 1500 can include additional implementations, such as any single implementation or any combination of implementations described below and/or in connection with one or more other processes described elsewhere herein. It should be appreciated that the specific steps illustrated in FIG. 15 provide techniques for fabricating a retention structure according to various embodiments of the present disclosure. Other sequences of steps can also be performed according to alternative embodiments. For example, alternative embodiments of the present disclosure can perform the steps outlined above in a different order. Moreover, the individual steps illustrated in FIG. 15 can include multiple sub-steps that can be performed in various sequences as appropriate to the individual step. Furthermore, additional steps can be added or removed depending on the applications. One of ordinary skill in the art would recognize many variations, modifications, and alternatives.

Figure 16:
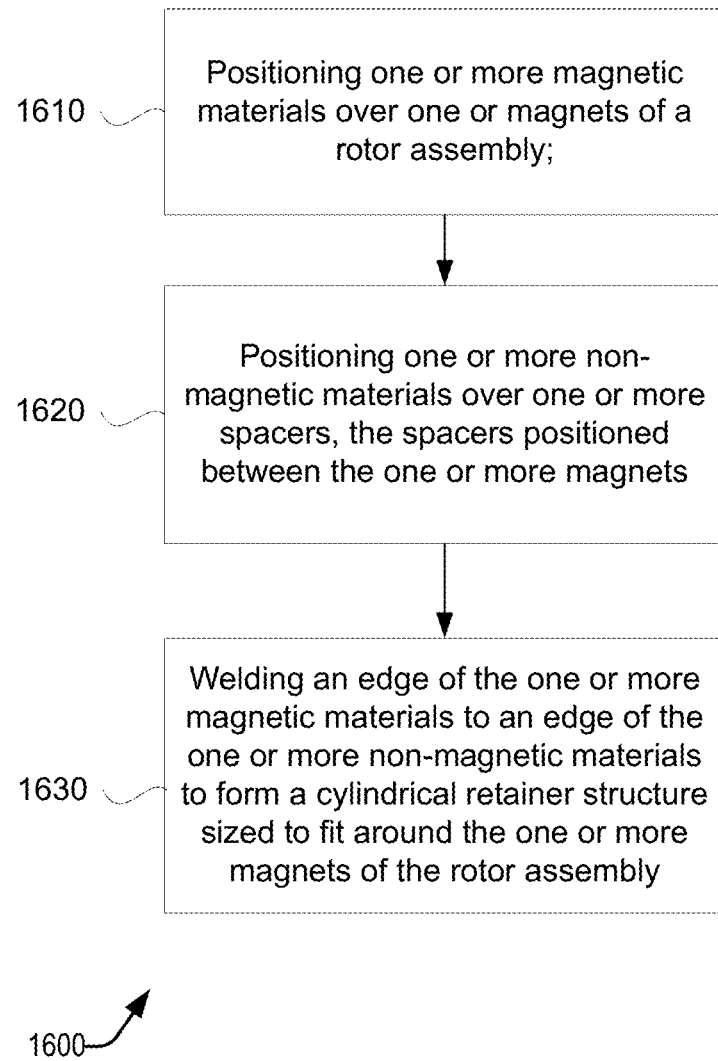
FIG. 16 is a flow chart of an example process for fabricating a retention structure according to an embodiment of the present invention.

FIG. 16 is a flow chart of an example process 1600 for fabricating a retention structure according to an embodiment of the present invention. The retention structure can include magnetic and non-magnetic regions. In some implementations, one or more process blocks of FIG. 16 can be performed by a welding system. In some implementations, one or more process blocks of FIG. 16 can be performed by another device, or a group of devices separate from or including the welding system.

The method can include positioning one or more magnetic materials over one or more magnets of a rotor assembly (1610). The positioning can be achieved using a rack to hold the magnetic and non-magnetic materials in place with respect to each other.

The method can include positioning one or more non-magnetic materials over one or more spacers, with the spacers positioned between the one or more magnets (1620). The positioning can be achieved using a rack to hold the magnetic and non-magnetic materials in place with respect to each other.

The method can include welding an edge of the one or more magnetic materials to an edge of the one or more non-magnetic materials to form a cylindrical retention structure sized to fit around the one or more magnets of the rotor assembly (1630). The welding can include MIG—Gas Metal Arc Welding (GMAW), TIG—Gas Tungsten Arc Welding (GTAW), Stick—Shielded Metal Arc Welding (SMAW) and Flux-cored—Flux-cored Arc Welding (FCAW).

Process 1600 can include additional implementations, such as any single implementation or any combination of implementations described below and/or in connection with one or more other processes described elsewhere herein. It should be appreciated that the specific steps illustrated in FIG. 16 provide techniques for fabricating a retention structure according to various embodiments of the present disclosure. Other sequences of steps can also be performed according to alternative embodiments. For example, alternative embodiments of the present disclosure can perform the steps outlined above in a different order. Moreover, the individual steps illustrated in FIG. 16 can include multiple sub-steps that can be performed in various sequences as appropriate to the individual step. Furthermore, additional steps can be added or removed depending on the applications. One of ordinary skill in the art would recognize many variations, modifications, and alternatives.

Figure 17:
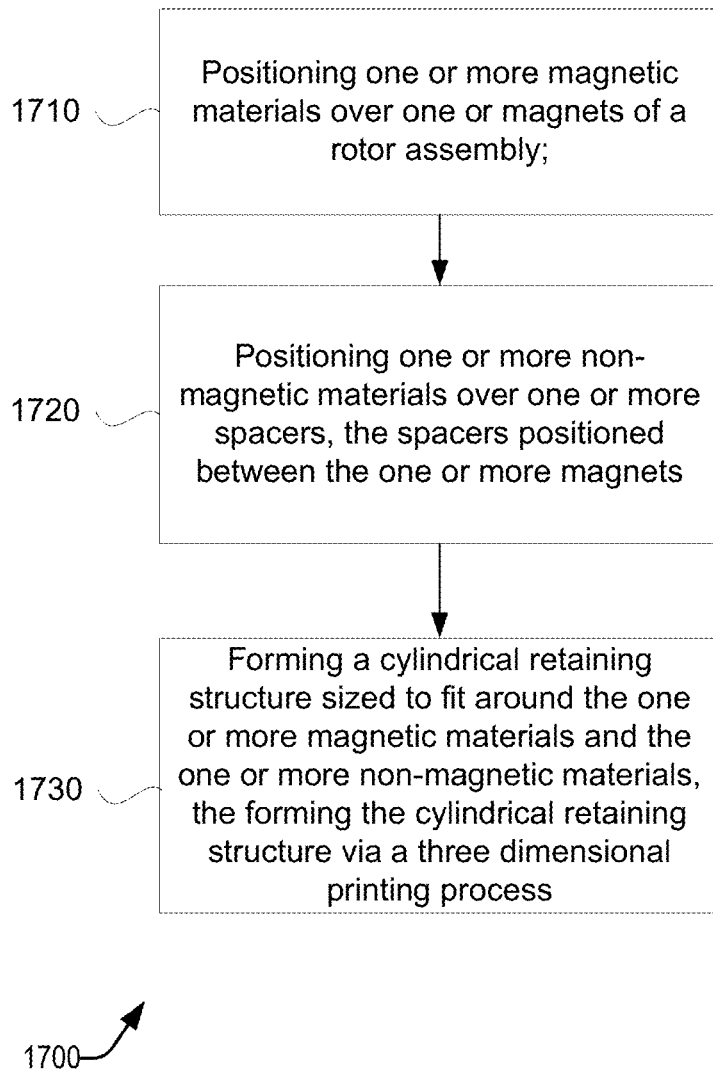
FIG. 17 is a flow chart of an example process for fabricating a retention structure according to another embodiment of the present invention.

FIG. 17 is a flow chart of an example process 1700 for fabricating a retention structure according to another embodiment of the present invention. The retention structure can include magnetic and non-magnetic regions. In some implementations, one or more process blocks of FIG. 17 can be performed by a three-dimensional (3D) printer. In some implementations, one or more process blocks of FIG. 17 can be performed by another device, or a group of devices separate from or including the 3D printer.

The method can include positioning one or more magnetic materials over one or more magnets of a rotor assembly (1710). The positioning can be achieved using a rack to hold the magnetic and non-magnetic materials in place with respect to each other.

The method can include positioning one or more non-magnetic materials over one or more spacers, with the spacers positioned between the one or more magnets (1720). The positioning can be achieved using a rack to hold the magnetic and non-magnetic materials in place with respect to each other.

The method can include forming a cylindrical retention structure sized to fit around the one or more magnetic materials and the one or more non-magnetic materials, the forming the cylindrical retention structure via a three-dimensional printing process (1730).

Process 1700 can include additional implementations, such as any single implementation or any combination of implementations described below and/or in connection with one or more other processes described elsewhere herein. It should be appreciated that the specific steps illustrated in FIG. 17 provide techniques for fabricating a retention structure according to various embodiments of the present disclosure. Other sequences of steps can also be performed according to alternative embodiments. For example, alternative embodiments of the present disclosure can perform the steps outlined above in a different order. Moreover, the individual steps illustrated in FIG. 17 can include multiple sub-steps that can be performed in various sequences as appropriate to the individual step. Furthermore, additional steps can be added or removed depending on the applications. One of ordinary skill in the art would recognize many variations, modifications, and alternatives.

Figure 18:
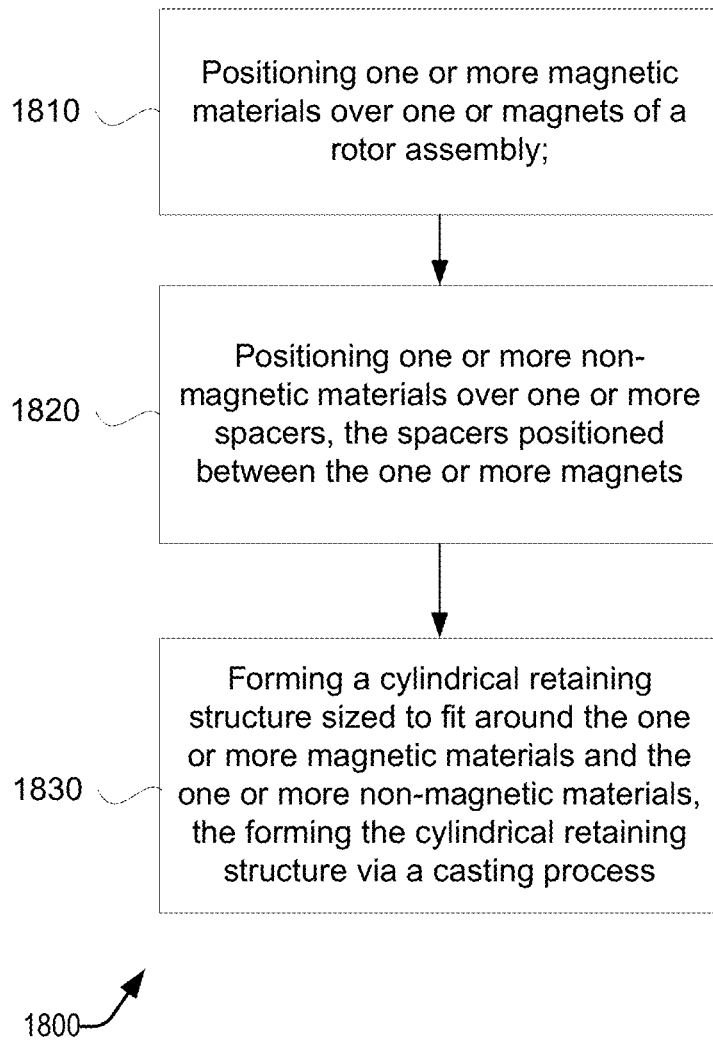
FIG. 18 is a flow chart of an example process for fabricating a retention structure according to a specific embodiment of the present invention.

FIG. 18 is a flow chart of an example process 1800 for fabricating a retention structure according to a specific embodiment of the present invention. The retention structure can include magnetic and non-magnetic regions. In some implementations, one or more process blocks of FIG. 18 can be performed by a casting process. In some implementations, one or more process blocks of FIG. 18 can be performed by another device, or a group of devices separate from or including a foundry.

The method can include positioning one or more magnetic materials over one or more magnets of a rotor assembly (1810). The positioning can be achieved using a rack to hold the magnetic and non-magnetic materials in place with respect to each other.

The method can include positioning one or more non-magnetic materials over one or more spacers, with the spacers positioned between the one or more magnets (1820). The positioning can be achieved using a rack to hold the magnetic and non-magnetic materials in place with respect to each other.

The method can include forming a cylindrical retention structure sized to fit around the one or more magnetic materials and the one or more non-magnetic materials, the forming the cylindrical retention structure via a casting process (1830). Casting is a manufacturing process in which a liquid material is usually poured into a mold, which contains a hollow cavity of the desired shape, and then allowed to solidify. The solidified part is also known as a casting, which is ejected or broken out of the mold to complete the process. Casting materials are usually metals or various time setting materials that cure after mixing two or more components together; examples are epoxy, concrete, plaster, and clay. Casting is most often used for making complex shapes that would be otherwise difficult or uneconomical to make by other methods. Heavy equipment like machine tool beds, ships' propellers, etc. can be cast easily in the required size, rather than fabricating by joining several small pieces.

Process 1800 can include additional implementations, such as any single implementation or any combination of implementations described below and/or in connection with one or more other processes described elsewhere herein. It should be appreciated that the specific steps illustrated in FIG. 18 provide techniques for fabricating a retention structure according to various embodiments of the present disclosure. Other sequences of steps can also be performed according to alternative embodiments. For example, alternative embodiments of the present disclosure can perform the steps outlined above in a different order. Moreover, the individual steps illustrated in FIG. 18 can include multiple sub-steps that can be performed in various sequences as appropriate to the individual step. Furthermore, additional steps can be added or removed depending on the applications. One of ordinary skill in the art would recognize many variations, modifications, and alternatives.

Figure 19:
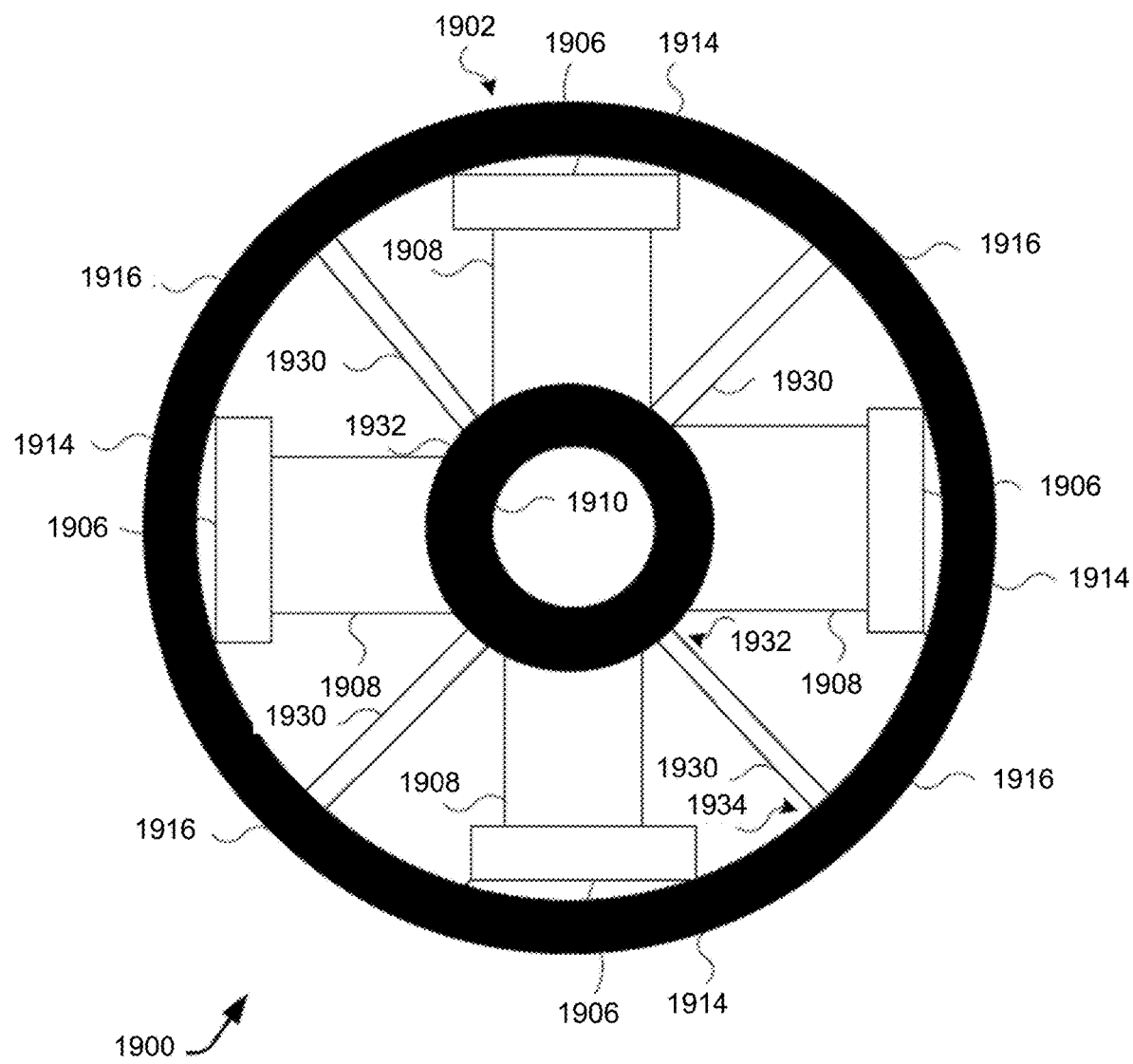
FIG. 19 illustrates a specific embodiment of the retention structure with a plurality of spokes.

FIG. 19 illustrates a side view of an exemplary retention structure 1902 of a rotor assembly 1900 for retaining a plurality of magnets 1906. The retention structure 1902 can include magnetic regions 1914 over the magnets 1906 attached to the pole retention structure 1908. The retention structure 1902 can also include non-magnetic regions 1916. The pole retention structure 1908 can be attached to the shaft 1910.

In various embodiments, the retention structure 1902 can include a plurality of spokes 1930. While FIG. 19 illustrates four spokes 1930 any number of spokes 1930 can be used. For example, FIG. 19 illustrates a spoke 1930 attached to each of the non-magnetic regions 1914. In various examples, the spokes 1930 may be attached to every other non-magnetic region 1914. In various alternate embodiments, multiple spokes 1930 may be attached to each non-magnetic region of the retention structure 1902.

The spokes 1930 can be fabricated as part of the retention structure 1902 (e.g., through HIP processes, casting, carbon fiber fabrication etc.). In various embodiments, the spokes 1930 can be fabricated independent of the retention structure 1902 and can be attached to the retention structure 1902 by any one of conventional means (e.g., welding, gluing, fasteners, etc.).

The spokes 1930 can include a proximal end 1932 and a distal end 1934. A distal end 1934 of the spokes 1930 can be affixed to the non-magnetic regions of the retention structure 1916. The proximal end 1932 of the spokes 1930 can be attached to a central hub 1936. The central hub 1936 can be fabricated as part of the retention structure 1902 (e.g., through HIP processes, casting, carbon fiber fabrication etc.). In various embodiments, the central hub 1936 can be fabricated independent of the retention structure 1902 and can be attached to the spokes 1930 by any one of conventional means (e.g., welding, gluing, fasteners, etc.). In various embodiments, the spokes 1930 can be directly attached to the shaft 1910, thereby eliminating the central hub 1936.

Figure 20:
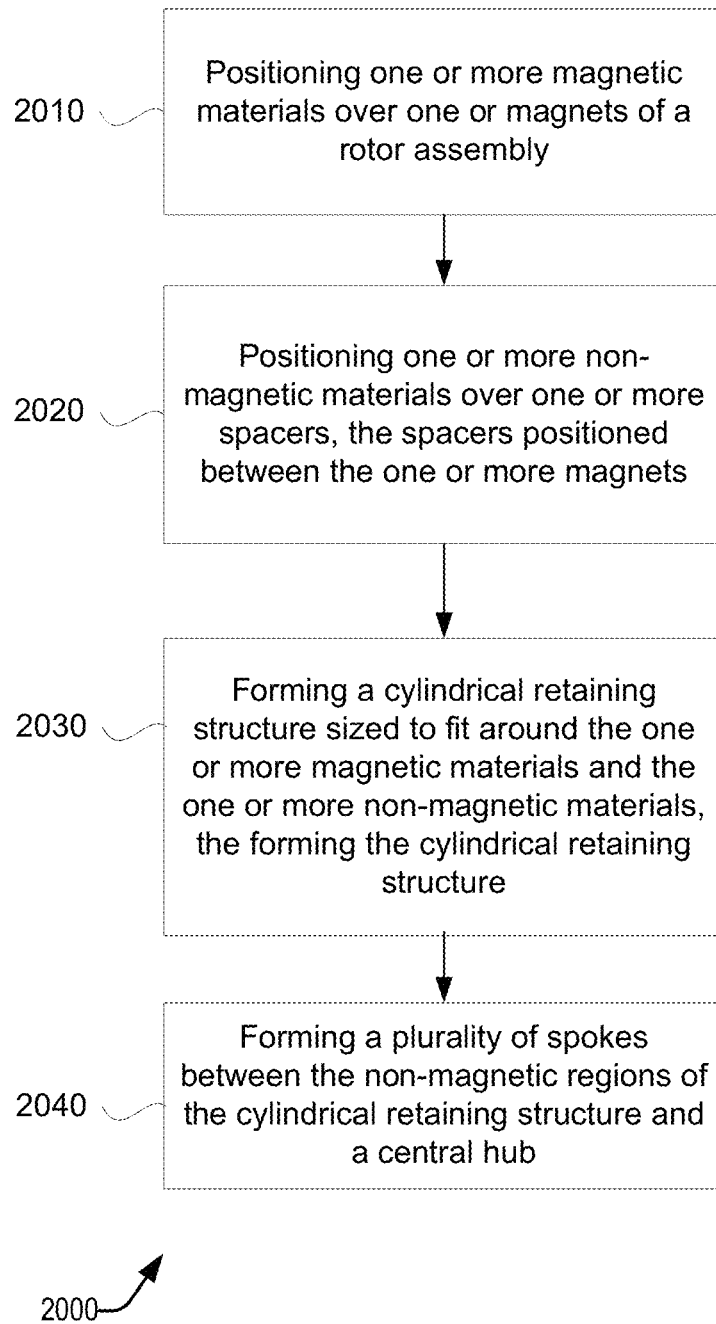
FIG. 20 is a flow chart of an example process for fabricating a retention structure according to another specific embodiment of the present invention.

FIG. 20 is a flow chart of an example process 2000 for fabricating a retention structure according to another specific embodiment of the present invention. The retention structure can include magnetic and non-magnetic regions. In some implementations, one or more process blocks of FIG. 20 can be performed by a casting process. In some implementations, one or more process blocks of FIG. 20 can be performed by another device, or a group of devices separate from or including a foundry.

The method can include positioning one or more magnetic materials over one or more magnets of a rotor assembly (2010). The positioning can be achieved using a rack to hold the magnetic and non-magnetic materials in place with respect to each other.

The method can include positioning one or more non-magnetic materials over one or more spacers, with the spacers positioned between the one or more magnets (2020). The positioning can be achieved using a rack to hold the magnetic and non-magnetic materials in place with respect to each other.

The method can include forming a cylindrical retention structure sized to fit around the one or more magnetic materials and the one or more non-magnetic materials (2030). In various embodiments, forming the cylindrical retention structure can be implemented via a welding process. In various embodiments, the forming the cylindrical retention structure via a 3D printing process. In various embodiments, forming the cylindrical retention structure can be implemented via a casting process. In various embodiments, forming the cylindrical retention structure can be implemented via one or more of extrusion, slip casting, pressing, tape casting and injection molding. In various embodiments, forming the cylindrical retention structure can be implemented via carbon fiber manufacturing processing.

The method can include forming a plurality of spokes between the non-magnetic regions of the cylindrical retention structure and a central hub (2040). The forming can be accomplished via one or more of the processes to include welding, casting, extrusion, slip casting, pressing, tape casting and injection molding, and carbon fiber manufacturing processing.

Process 2000 can include additional implementations, such as any single implementation or any combination of implementations described below and/or in connection with one or more other processes described elsewhere herein. It should be appreciated that the specific steps illustrated in FIG. 20 provide techniques for fabricating a retention structure according to various embodiments of the present disclosure. Other sequences of steps can also be performed according to alternative embodiments. For example, alternative embodiments of the present disclosure can perform the steps outlined above in a different order. Moreover, the individual steps illustrated in FIG. 20 can include multiple sub-steps that can be performed in various sequences as appropriate to the individual step. Furthermore, additional steps can be added or removed depending on the applications. One of ordinary skill in the art would recognize many variations, modifications, and alternatives.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the disclosure. Also, a number of steps may be undertaken before, during, or after the above elements are considered.

What is claimed is:

1. A structure comprising:
   a rotor;
   a plurality of permanent magnets positioned around the rotor;
   a plurality of spaces separating each permanent magnet of the plurality of permanent magnets; and
   a cylindrical hoop configured to retain the plurality of permanent magnets to the rotor, the cylindrical hoop comprising:
   a plurality of non-magnetic regions, wherein each of the plurality of non-magnetic regions is aligned with a corresponding space of the plurality of spaces; and
   a plurality of magnetic regions, wherein each of the plurality of magnetic regions is aligned with a corresponding permanent magnet of the plurality of permanent magnets, tangentially alternates with each of the plurality of non-magnetic regions, and is joined to adjacent non-magnetic regions at a bond interface including a portion of each magnetic region extending into the adjacent non-magnetic region.

2. The structure of claim 1, further comprising:
   a stator surrounding the structure and having a second plurality of magnetic regions, wherein the cylindrical hoop provides for a continuous radial magnetic air gap between the plurality of permanent magnets positioned around the rotor and the second plurality of magnetic regions of the stator while reducing magnetic flux leakage across the plurality of non-magnetic regions.

3. The structure of claim 1, wherein the plurality of magnetic regions and the plurality of non-magnetic regions form staves of the cylindrical hoop.

4. The structure of claim 1, wherein the cylindrical hoop is sized to provide a pre-load force to the plurality of permanent magnets positioned around the rotor.

5. The structure of claim 1, wherein the plurality of magnetic regions are a combination of a plurality of materials forming different layers.

6. The structure of claim 1, wherein the plurality of non-magnetic regions are a combination of a plurality of materials forming different layers.

7. The structure of claim 1, wherein each of the plurality of magnetic regions comprises a crowned exterior surface to shape flux lines of the plurality of permanent magnets positioned around the rotor.

8. The structure of claim 7, wherein the bond interface extends along each crowned exterior surface.

9. The structure of claim 1, wherein an interior surface of the cylindrical hoop is not circular, and wherein the plurality of permanent magnets positioned around the rotor are rectangular.

10. The structure of claim 1, wherein an exterior surface of the cylindrical hoop is continuous.

11. The structure of claim 1, wherein at the bond interface, the adjacent non-magnetic region partially surrounds the portion of each magnetic region.

12. An electric machine, comprising:
a housing;
a rotor assembly positioned inside the housing and including a plurality of permanent magnets separated by a plurality of spaces;
a retaining sleeve positioned around the rotor assembly and configured to retain the plurality of permanent magnets to the rotor assembly, the retaining sleeve comprising:
a plurality of non-magnetic regions, wherein each of the plurality of non-magnetic regions is aligned with a corresponding space of the plurality of spaces; and
a plurality of magnetic regions, wherein each of the plurality of magnetic regions is aligned with a corresponding permanent magnet of the plurality of permanent magnets, tangentially alternates with each of the plurality of non-magnetic regions, and is joined to adjacent non-magnetic regions at a bond interface including a portion of each magnetic region extending into the adjacent non-magnetic region; and
a stator surrounding the rotor assembly and the retaining sleeve and having a second plurality of magnetic regions.

13. The electric machine of claim 12, further comprising:
an air gap between the rotor assembly and the stator, wherein the retaining sleeve provides for a continuous radial magnetic air gap between the plurality of permanent magnets and the second plurality of magnetic regions of the stator while reducing magnetic flux leakage across the plurality of non-magnetic regions.

14. The electric machine of claim 12, wherein the plurality of magnetic regions and the plurality of non-magnetic regions form staves of the retaining sleeve.

15. The electric machine of claim 12, wherein the retaining sleeve is cylindrical and is sized to provide a pre-load force to the plurality of permanent magnets of the rotor assembly.

16. The electric machine of claim 12, wherein the plurality of non-magnetic regions are a combination of a plurality of materials forming different layers.

17. The electric machine of claim 12, wherein each of the plurality of magnetic regions comprises a crowned exterior surface to shape of flux lines of the plurality of permanent magnets.

18. The electric machine of claim 12, wherein an interior surface of the retaining sleeve is not circular, and wherein the plurality of permanent magnets are rectangular.

19. The electric machine of claim 12, wherein an exterior surface of the retaining sleeve is continuous.

20. The electric machine of claim 12, wherein the rotor assembly further comprises:
a shaft;
a pole retention structure connecting the plurality of permanent magnets to the shaft; and
a plurality of spokes, each spoke of the plurality of spokes having a proximal end and a distal end, wherein the proximal end of each spoke is attached to the shaft, and wherein the distal end of each spoke is attached to a non-magnetic region of the plurality of non-magnetic regions.

* * * * *